(12) United States Patent
Kan

(10) Patent No.: US 8,452,788 B2
(45) Date of Patent: May 28, 2013

(54) INFORMATION RETRIEVAL SYSTEM, REGISTRATION APPARATUS FOR INDEXES FOR INFORMATION RETRIEVAL, INFORMATION RETRIEVAL METHOD AND PROGRAM

(75) Inventor: Masaki Kan, Tokyo (JP)

(73) Assignee: NEC Corporation, Tokyo (JP)

( * ) Notice: Subject to any disclaimer, the term of this patent is extended or adjusted under 35 U.S.C. 154(b) by 274 days.

(21) Appl. No.: 12/244,551

(22) Filed: Oct. 2, 2008

(65) Prior Publication Data

US 2009/0094186 A1    Apr. 9, 2009

(30) Foreign Application Priority Data

Oct. 5, 2007 (JP) ................. 2007-262252

(51) Int. Cl.
*G06F 7/00*    (2006.01)
(52) U.S. Cl.
USPC .......................................... 707/758; 707/711
(58) Field of Classification Search
USPC ................................. 707/711, 758
See application file for complete search history.

(56) References Cited

U.S. PATENT DOCUMENTS

| | | | |
|---|---|---|---|
| 5,727,197 A | 3/1998 | Burgess et al. | |
| 6,049,804 A | 4/2000 | Burgess et al. | |
| 2008/0091744 A1* | 4/2008 | Shitomi et al. | 707/204 |
| 2008/0215546 A1* | 9/2008 | Baum et al. | 707/3 |
| 2008/0228695 A1* | 9/2008 | Sifry et al. | 707/2 |

FOREIGN PATENT DOCUMENTS

| | | |
|---|---|---|
| JP | 7-146880 A | 6/1995 |
| JP | 7-325839 A | 12/1995 |
| JP | 9-223152 A | 8/1997 |
| JP | 9212528 A | 8/1997 |
| JP | 1028365 A | 1/1998 |
| JP | 11195039 A | 7/1999 |
| JP | 2000259646 A | 9/2000 |
| JP | 2001331510 A | 11/2001 |
| JP | 2006-91993 A | 4/2006 |

OTHER PUBLICATIONS

Kenji Kita, Kazuhiko Tsuda and Masamiki Shishibori, 'Information Retrieval Algorithm', Kyoritsu Shuppan, Jan. 1, 2002, pp. 6 and pp. 160-179.
Office Action dated Aug. 21, 2012 issued by the Japanese Patent Office in counterpart Japanese Application No. 2007-262252.
Kan, Masaki, et al., "Proposal of Information Retrieval System which can Retrieve the Past", Proceeding of the 2007 IEICE General Conference; Information, System 1; Japan; The Institute of Electronics, Information and Communication Engineers; Mar. 7, 2007; pp. 31-33.

(Continued)

*Primary Examiner* — John E Breene
*Assistant Examiner* — Joshua Bullock
(74) *Attorney, Agent, or Firm* — Sughrue Mion, PLLC

(57) ABSTRACT

An information retrieval system comprising: an information acquisition unit that acquires information as a subject of retrieval; a time information specifying unit that specifies time information owned by said information as the subject of retrieval; and an index updating unit that updates said index using the time information specified by said time information specifying unit; wherein said information retrieval system provides an information retrieving function of reproducing retrieved results at any time point by providing index for information retrieval with the time information and by using data of said index relevant to a reference point of retrieval identified at the time of retrieval.

2 Claims, 14 Drawing Sheets

OTHER PUBLICATIONS

Sato, Takashi, "Partitioned Indexes Formed in Log-structure", DBSJ Letters, Japan; The Database Society of Japan; Jun. 29, 2007; vol. 6, No. 1, pp. 13-15.

Kage, Tomoyo, et al., "A Web Archive Search Engine Based on the Temporal Relation of Query Keywords", Proceeding of DEWS 2006 (online); Japan, IEICE Data Engineering Technical Group; Jun. 30, 2006; pp. 1-9.

Communication dated Dec. 4, 2012 from the Japanese Patent Office in counterpart Japanese application No. 2007-262252.

* cited by examiner

INFORMATION RETRIEVAL SYSTEM, REGISTRATION APPARATUS FOR INDEXES FOR INFORMATION RETRIEVAL, INFORMATION RETRIEVAL METHOD AND PROGRAM

REFERENCE TO RELATED APPLICATION AND FIELD OF THE INVENTION

This application is based upon and claims the benefit of the priority of Japanese patent application No. 2007-262252 filed on Oct. 5, 2007, the disclosure of which is incorporated herein in its entirety by reference thereto.

This invention relates to an information retrieval system, an apparatus for registration of an index for information retrieval, a method and for information retrieval and a program for information retrieval. More particularly, it relates to an information retrieval system, an apparatus for index registration for information retrieval, and a method as well as a program for information retrieval, in which retrieved results at any time point may be reproduced by providing indexes for information retrieval with time information and by using data of the indexes that is relevant to a reference point of retrieval as identified at the time of retrieval.

BACKGROUND

Full-text retrieval has become common with coming into widespread use of the Web retrieval system of which Google (registered trademark) is an example. Depending on the using methods, it has become possible to acquire the highly fresh information by retrieving the information with the use of a retrieval system, rather than by using bookmark functions, provided in pre-existing browsers, or by using a variety of portal sites.

As regards this full-text retrieval, the scheme of preparing indexes (clues) in advance and retrieving electronic files at a high speed with the use of the so prepared indexes is now the mainstream.

Non-Patent Document 1 describes a method for preparing an inverted file which is most common as the aforementioned indexes.

The indexes, prepared by such system, are generally non-compressed and of a large capacity equal to 200 to 300% of the original document. Moreover, to keep freshness of the results of retrieval, it is necessary to dynamically update the indexes in dependence upon the state of the data being retrieved.

For example, if an index was prepared one day before, a state of data as the subject for retrieval, registered or updated after such time, is not reflected. As a matter of course, the results of retrieval are those one day before, resulting that newly registered data is overlooked or attempts are made in vain to access deleted data.

In light of above, there is disclosed in Patent Document 1 a document retrieval apparatus in which an index relevant to a newly registered document file is prepared and stored in a memory. A document retrieving section retrieves the document file using both the index data of data of the new document stored in the memory and index data of pre-existing document files stored in a disc apparatus.

There is also disclosed in Patent Document 2 a document retrieval apparatus in which, in registering a novel document in an index, such document is registered in a sub-index smaller than a main index. Each index is accessed and retrieved, in the course of retrieval, and the results are combined together to form the results of retrieval.

Patent Document 3, as another related technique, discloses a query response system, which is a sort of the information retrieval system. On the other hand, Patent Document 4, as still another related technique, discloses a chronological data processing apparatus. The query response system, disclosed in Patent Document 3, includes a relative expression analysis means and a response retrieving means. The relative expression analysis means analyzes relative expressions with respect to an axis, including the time axis, from a user's query containing the relative expressions, in order to find out an accurate response to the query. The response retrieving means retrieves the responses to the query out of extracted information data.

Further, Patent Document 4 discloses a chronological data processing apparatus formed by database units resulting from splitting per unit along the time axis. Data collected by e.g. a sensor is stored in the date-based database unit to localize the indexes, referenced in the course of retrieval, for realization of the high-speed retrieval.

[Patent Document 1]
JP Patent Kokai JP-A-9-223152
[Patent Document 2]
JP Patent Kokai JP-A-7-146880
[Patent Document 3]
JP Patent Kokai JP-A-2006-91993
[Patent Document 4]
JP Patent Kokai JP-A-7-325839
[Non-Patent Document 1]
Kenji KITA, Kazuhiko TSUDA and Masamiki SHISHIBORI, 'Information Retrieval Algorithm', Kyoritsu Shuppan, Jan. 1, 2002, pp. 6 and pp. 160~179

SUMMARY OF THE DISCLOSURE

The entire disclosures in the above-mentioned Non-Patent Document and Patent Documents are incorporated herein by reference. The analysis below is given by the present invention.

As an attempt to improve the added value of the information retrieval system, it is desirable to realize the function of displaying the retrieved result for any arbitrary time point specified or any (arbitrary) time interval specified. This function is sometimes referred to as a "chronological retrieving function". As premises for realization of this function, it is necessary to provide (or prepare) an index for information retrieval having the time information that may be used for the above purpose.

In particular, it may be expected that, in booting a newly installed information retrieval system, having the chronological retrieving function, the index preparation has not been completed, yet, and hence advantage of the chronological retrieving function can not be achieved in a full extent.

At any rate, it is thought to be necessary to decide on which sort of the time information is to be afforded to the data as the subject (objective) for retrieval of the information retrieval system, at which time point retrieval is to be made, and from which time point any date concerned is to be outside the subject for the retrieval, in consideration that such decision appreciably influences the performance of the information retrieval system.

In light of the above, it is an object of the present invention to provide an apparatus for registering index for information retrieval whereby it is possible to improve the chronological retrieving function that specifies the time point of retrieval. It is also contemplated by the present invention to provide an information retrieval system, exploiting the above apparatus, a method for retrieving the information, and a program for retrieving the information.

In a first aspect, the present invention there is provided an information retrieval system that provides an information retrieving function of reproducing retrieved results at any time point by providing index for information retrieval with the time information and by using data of the index relevant to a reference point of retrieval, as identified at the time of retrieval. The information retrieval system comprises an information acquisition unit that acquires information as a subject of retrieval, a time information specifying unit that identifies the time information owned by the information as the subject of retrieval, and an index updating unit that updates the index using the time information specified by the time information specifying unit.

In a second aspect, the present invention provides an apparatus for registering an index to be used in an information retrieval system that provides an information retrieving function of reproducing retrieved results at any time point by providing index for information retrieval with the time information and by using data of the index relevant to a reference point of retrieval identified at the time of retrieval. The apparatus for registering the index comprises: an information acquisition unit that acquires information as a subject of retrieval; a time information specifying unit that specifies time information owned by the information as the subject of retrieval; and an index updating unit that updates the index using the time information specified by the time information specifying unit.

In a third aspect, the present invention provides a program to be used in an information retrieval system that provides an information retrieving function of performing retrieval starting at any time point. Indexes are used as an index for information retrieval with the time information and use is made of the index relevant to a reference point of retrieval specified at the time of retrieval. The program is executed on a computer that forms an apparatus for registering the index. The program comprises processings of: acquiring the information as a subject for retrieval; specifying time information owned by the information as the subject of retrieval; and updating a portion of an index or indexes corresponding to the time information specified.

In a fourth aspect of the present invention, the present invention provides a method for registering an index which is to be used in an information retrieval system that provides an information retrieving function of permitted retrieval starting at any time point, by providing an index for information retrieval with the time information, and by using data of the index relevant to a reference point of retrieval identified in the course of retrieval. The method for registering the index comprises: acquiring information as a subject for retrieval, specifying time information of the subject of retrieval, and updating the index using the time information thus specified.

According to the present invention, output results of the chronological retrieving function may be improved in accuracy and efficiency since the time information of the data as the subject for retrieval is identified and reflected in relevant portions of the index for information retrieval that realize the function. Moreover, according to the present invention, the information retrieval system, provided with the chronological retrieving function, may be introduced and booted easily since the time information of the data as the subject for retrieval that existed in the past as well as data that is to exist at a future time point may be identified and correctly reflected in the index.

Figure 1:
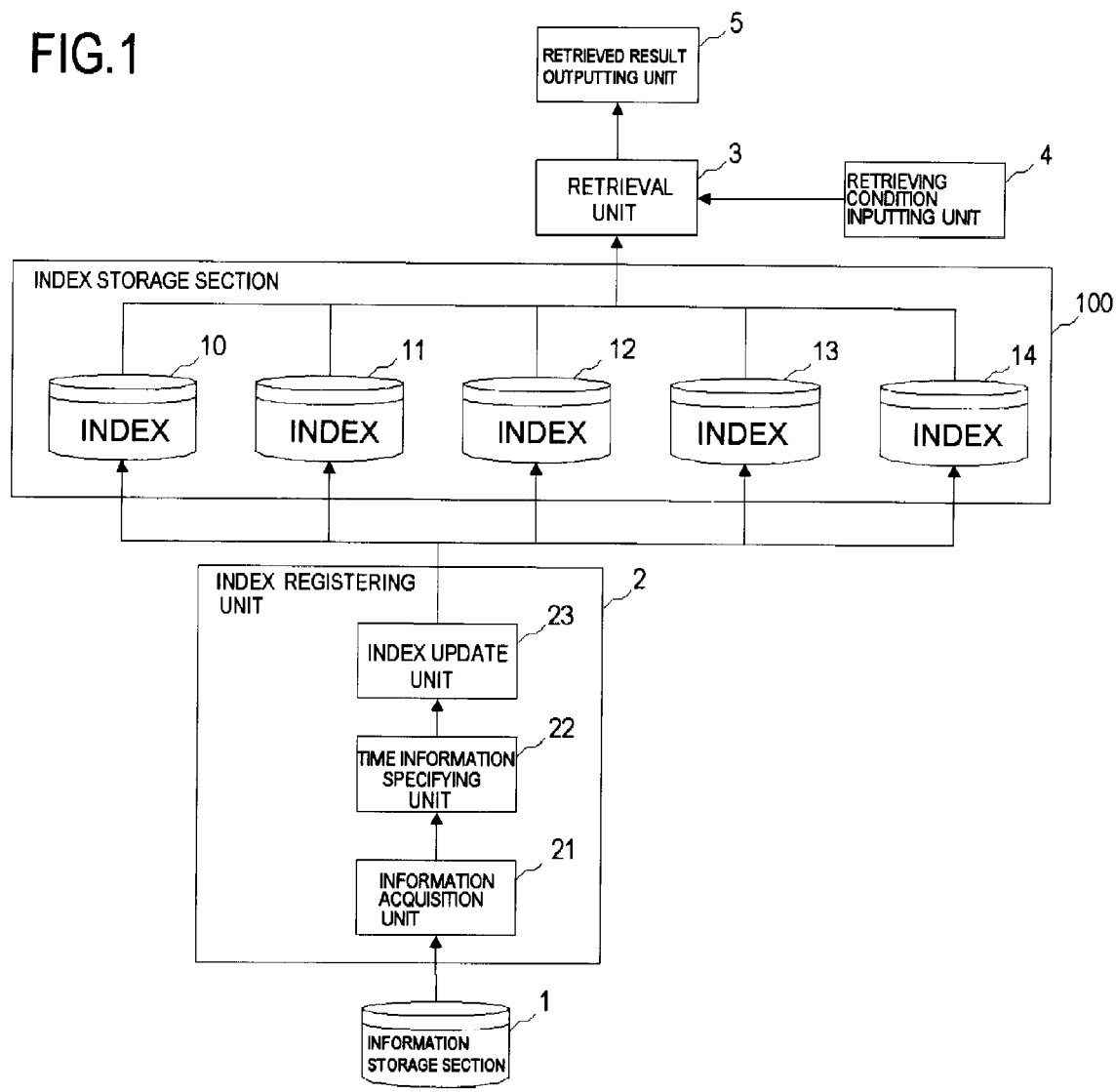
FIG. 1 is a schematic view showing a formulation of an information retrieval system according to a first exemplary embodiment of the present invention.

EXPLANATION OF NUMERALS 1 information storage section
2 index registering unit (index registering device)
3 retrieval unit
4 retrieving condition inputting unit
5 retrieved result outputting unit
6 backup information storage section
7 backup management unit
8 index management unit
10~17 Indexes (divided index sections)
21 information acquisition unit
22 time information specifying unit
23 index update unit
24 addition unit from backup
100 index storage section

PREFERRED MODES

First Embodiment

The preferred modes for carrying out the present invention are now described in detail with reference to the drawings.

FIG. 1 depicts a diagram showing a formulation of an information retrieval system according to a first exemplary embodiment of the present invention. Referring to FIG. 1, an information retrieval system includes an information storage section 1, an index registering unit 2, a retrieval unit 3, a retrieving condition inputting unit 4, a retrieved result outputting unit 5 and an index storage section 100.

To aid in understanding the present invention, it is assumed in the present exemplary embodiment that the index storage section 100 has stored a set of indexes newly prepared and saved in the chronological order in accordance with a preset standard. In the following, the state of splitting of the index by this preparation and saving is termed 'divided section'. These indexes are selectively referenced in accordance with reference (or starting basic) point(s) of information retrieval that are specified either directly or indirectly by the retrieving conditions, and are used to reproduce the results of retrieval as if retrieval were made at any (arbitrary) time point. FIG. 1 shows the formulation in which the index is divided into five divided sections 10 to 14 termed "Index", respectively. However, there is no limitation to the number of the divisions, such that, for example, it may be presumed that a new Index or Indexes (i.e., divided sections) is/are added to the system as time elapses as from the beginning of system management. The supervision (management) of a set of the indexes obtained on division (Indexes 10 to 14 of FIG. 1) is described subsequently.

The index storage section 100 may, for example, be implemented by any storage device, such as memories or magnetic disc devices. The Indexes 10 to 14 may be saved in respective different storage devices or may also be saved in the same storage device. The physical or logical storage positions or formulation of the Indexes 10 to 14 may also be varied in accordance with the application or the size of the information retrieval system.

The respective units (or stages), shown in FIG. 1, operate substantially as follows:

The information storage section 1 performs a function of holding information of the subject for retrieval. The information storage section 1 may be exemplified by, for example, hard disc devices of personal computers owned by users; external devices, such as NAS (Network Attached Storage); WWW (World Wide Web);
Intranet (sets of Web pages within business organizations); and
storage devices for backup and information systems.

The information as the subject of retrieval includes electronic files present in the above-mentioned information storage section, such as Web pages, office documents, still images, moving pictures, structured information in the databases, and so forth.

The index registering unit 2 is made up of an information acquisition (accepting) unit 21, a time information specifying unit 22 and an index update unit 23. The index registering unit 2 may be formed by an index registration device, formed in turn by an information processing device, such as a personal computer.

The information acquisition (accepting) unit 21 acquires, from the information storage section 1, information to be registered in the retrieval index, or accepts the information transferred from the information storage section 1, and delivers it to the time information specifying unit 22.

The time information specifying unit 22 specifies the time information for the information, as the subject for retrieval, as received by the information acquisition unit 21. The method for identifying the time information may be exemplified by a method of discriminating the time information from contents recorded in meta-information added to the information as a subject for retrieval or in the information of the subject for retrieval, and by a method of acquiring time information relevant to the information from an external information management system. The time information specifying unit 22 delivers the time information and the information on the subject for retrieval to the information update unit 23.

The index update unit 23 receives the time information and the information on the subject for retrieval from the time information specifying unit 22. The information update unit 23 specifies the index(es) to be registered or updated, out of the Indexes 10 to 14 in the index storage section 100, using the time information received. If, after specifying the index(es) to be registered or updated, it has become necessary to update the index of the information as the subject of retrieval, the index update unit 23 analyzes the contents of the information of the subject for retrieval, and updates the index(es) using an N-Gram method, for instance.

Of course, it is also possible for the information acquisition unit 21 to directly deliver the information as the subject for retrieval to the index update unit 23, and for the time information specifying unit 22 to deliver only the time information to the index update unit 23.

If the time to be involved in performing index registration or update processing or the time involved in scrolling is set to be the time information, the time information specifying unit 22 may deliver the information to the index update unit 23 without performing special processing.

Of course, a method of using the above meta-information or discriminating the time information from the information of the subject for retrieval per se, or a method of using the time information that may be identified by the index update unit 23, may be selected depending on the sorts of the information as the subject for retrieval. The time information with higher reliability may be selected from among a plurality of the time information that may be specified. In this case, the time information having higher reliability and which may be specified may be selected in accordance with a preset priority sequence from among the information acquired by any of the above methods.

The retrieval unit 3 receives retrieving conditions, such as keywords for retrieval or retrieving time points, that is, time points at which a set of documents is to be retrieved. The retrieval unit then performs the retrieving processing, selectively using the Indexes 10 to 14, depending on the retrieving conditions. The retrieving unit 3 delivers the results of the retrieving processing to the retrieved result outputting unit 5. Depending on the states of the Indexes 10 to 14, the results of the retrieving processing by the retrieval unit 3 are theoretically equivalent to the results of retrieval obtained in case information retrieval is carried out at any time point on the conventional information retrieval system which does not store or selectively use the indexes.

The retrieving condition inputting unit 4 performs the function of specifying the retrieving conditions, such as
retrieving keywords for retrieval or
the information as the reference point of retrieval and delivering the so identified retrieving conditions to the retrieval unit 3. The information as the reference point of retrieval may, in addition to the time information, such as year-month-date or hour-minute, the incentive information, such as time-related events.

The retrieving condition inputting unit 4 may, for example, be an input box of a retrieval keyword that may be entered from a user's Web browser.

The retrieved result outputting unit 5 performs the function of receiving the results of the retrieving processing carried out by the retrieval unit 3 and outputting the retrieved results to the user. The retrieved result outputting unit 5 may be exemplified by software that outputs a list of retrieved results on the user's Web browser.

Meanwhile, the functions and the operations of the index registering unit 2, retrieval unit 3, retrieving condition inputting unit 4 and the retrieved result outputting unit 5 may be implemented by a program executed on a computer.

Figure 2:
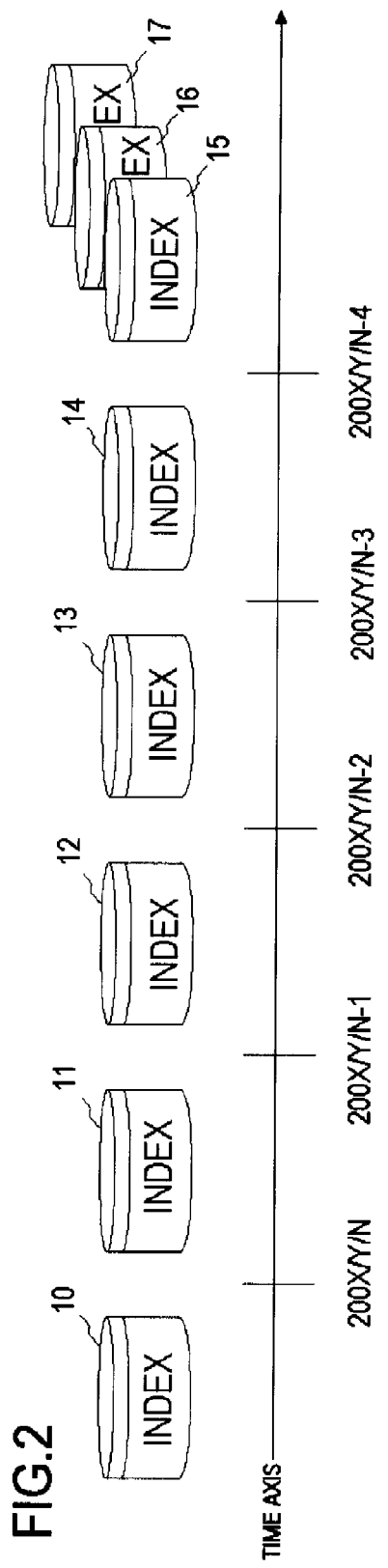
FIG. 2 is a schematic view for illustrating an example of index management in an index storage section of FIG. 1.

FIG. 2 schematically shows an instance of index management in the index storage section 100. In the case of the instance of FIG. 2, the index is divided on the time axis into indexes at a time interval of one index per day. Note the time axis (arrow) is directed toward the past.

It is now assumed that the current date is the day N of the month Y of the year 200X and new information (information of the subject of retrieval) has been acquired from the information storage section 1. In case the time of the index update and registration, that is, the day N of the month Y of the year 200X, is used as the time information, the information of the subject for retrieval is registered in the latest Index 10 relevant to the day N of the month Y of the year 200X.

In similar manner, the information of the subject of retrieval acquired one day before, that is, on the day N–1 of the month Y, is retained in Index 11 on a directly right side of the above-mentioned latest Index 10; and the information of the subject of retrieval acquired two days before, that is, on the day N–2 of the month Y, is retained in a second right Index 12 of the latest Index 10.

The latest index is newly prepared at a preset incident (or occurrence of event), such as establishment of a new condition for index preparation. As a consequence, the index, which has so far been latest, such as the Index 10 of FIG. 2, becomes the second latest Index.

The past latest indexes are saved sequentially as they are in this manner as indexes. Thus, past indexes are accumulated and increased in volume with lapse of time.

The scheme of newly preparing and saving the indexes may be implemented by changing the registration path to the destination of registration of the index registering unit 2.

Alternatively, the scheme may also be implemented by duplicating (copying) data of the latest index 10 to set them as past indexes, thereby vacating the latest Index 10.

Instead of newly preparing the latest index each time, a plurality of unused (not-yet-used) indexes may be prepared in advance for past time and/or future time.

Instead of newly preparing the latest index(es) at a preset incident, new index(es) may also be prepared in case the necessity arises, for example, in case there lacks an index to be registered in the processing of index registration carried out by the index registering unit 2.

Figure 3:
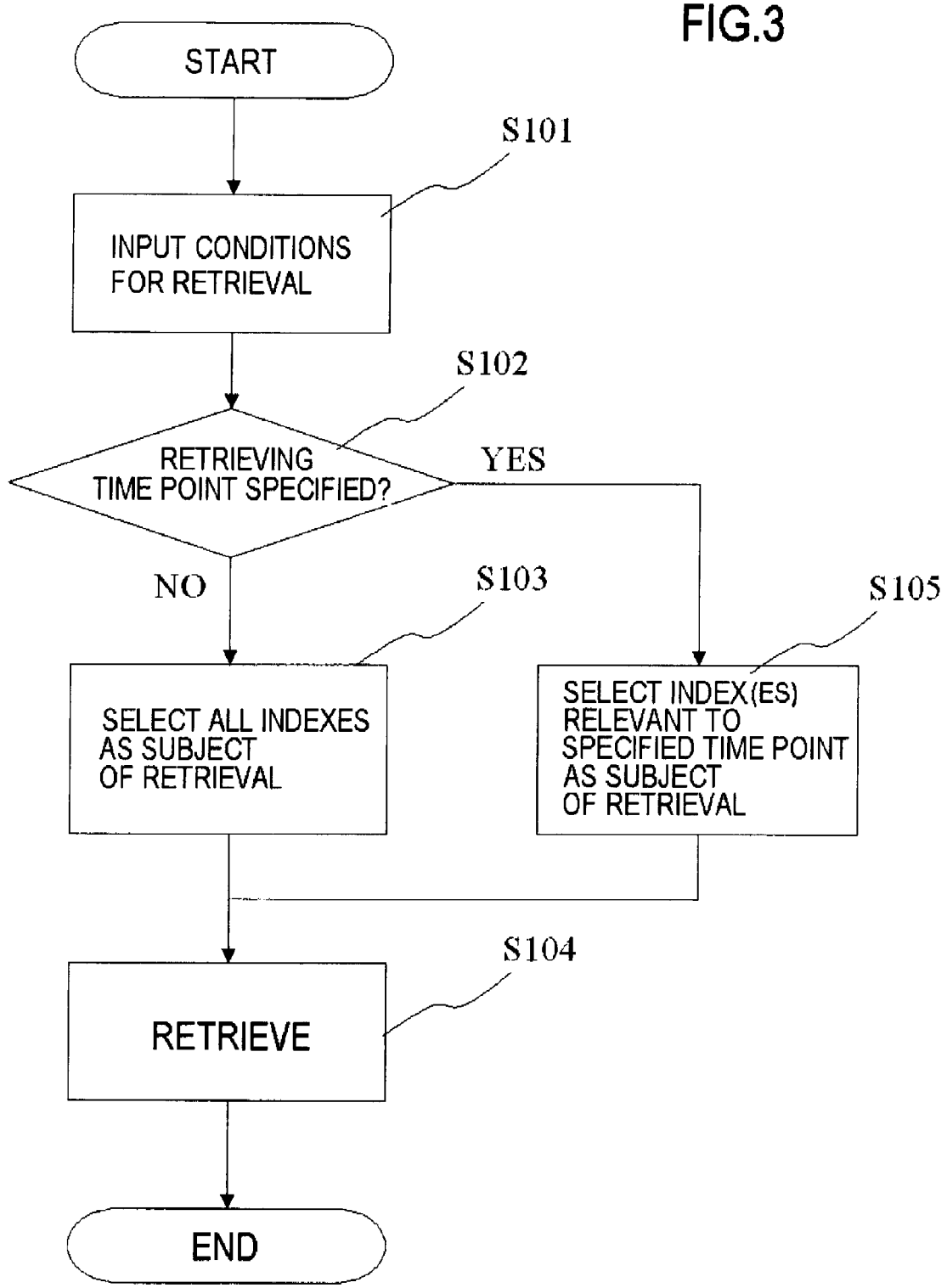
FIG. 3 is a flowchart for illustrating a retrieval processing of the information retrieval system according to the first exemplary embodiment of the present invention.

Referring to the flowchart of FIG. 3, an operation of processing for information retrieval of the information retrieval system, employing plural indexes, obtained on division in the chronological order, as described above, is now described in detail.

Initially, a user enters retrieving conditions via the retrieving condition inputting unit 4 as input (step S101).

As retrieving conditions, the user enters routine retrieving query information (for example, retrieving keywords), and information on the date and time, as a reference (or starting) point of the retrieving processing, if necessary.

The reference point information is information needed in performing (starting) retrieval processing from any past time point or any future time point, that is, the information needed in preparing the result of retrieved results when it is supposed that retrieval be carried out at any arbitrary time point.

For example, the retrieval processing from the past time point is such processing which is based on an index(es) that was (were) available three days before, in case it is desired to obtain the result identical with the retrieval processing carried out three days before.

The retrieval unit 3 then confirms whether or not the reference point information has been entered, that is, whether or not the time point for retrieval has been specified (step S102).

In case the reference point information has not been entered (NO branching at a step S102), the retrieval unit 3 selects all indexes so that these will be used for the retrieval processing (step S103).

On the other hand, in case the reference point information has been entered (YES branching in a step S102), the retrieval unit 3 selects the index(es) temporally before the reference point information specified so that these index(es) will be used for the retrieval processing (step S105).

When the indexes used for retrieving are determined as described above, the retrieval unit 3 executes retrieval using the so selected index(es) (step S104). The retrieval unit 3 notifies the retrieved result outputting unit 5 of the retrieved results.

The processing for selecting the indexes in the above step S103 is now described in detail with reference to an example shown in FIG. 4.

Figure 4:
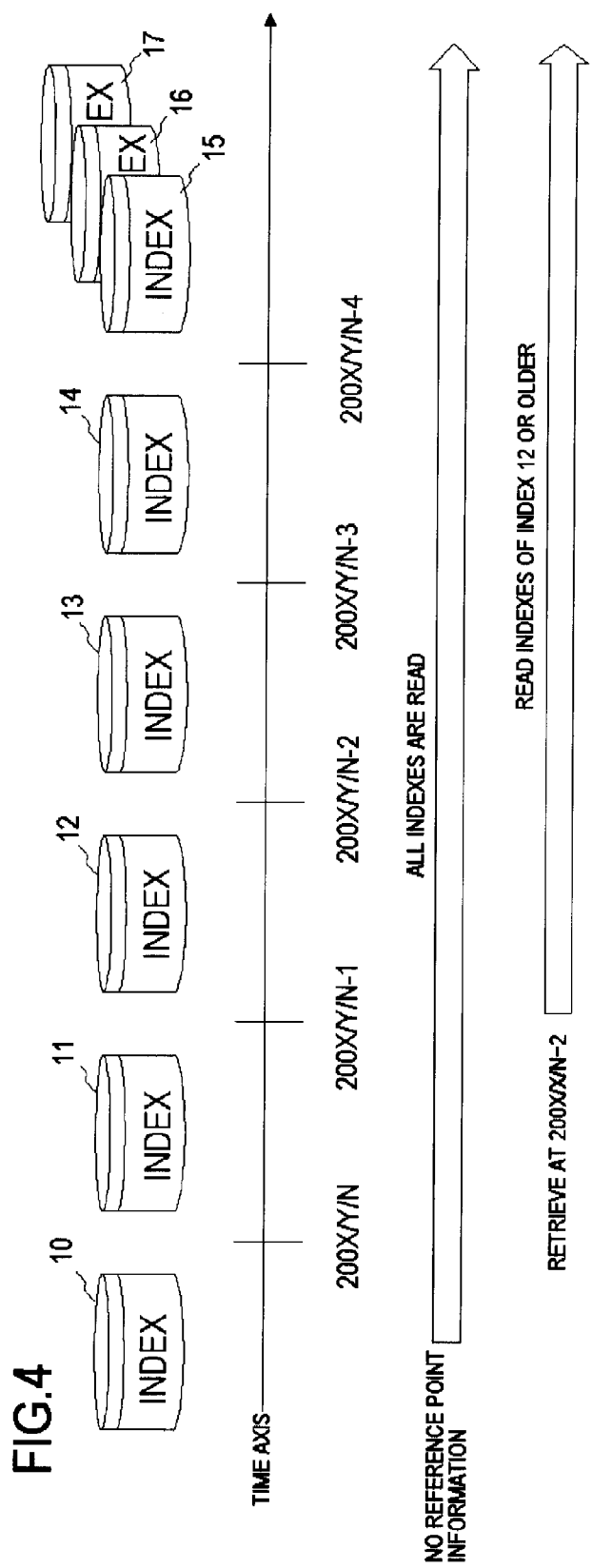
FIG. 4 is a schematic view showing a processing for selecting index of the information retrieval system according to the first exemplary embodiment of the present invention.

In the example of FIG. 4, there are provided eight Indexes 10 to 17. If the reference point information as the retrieving condition has not been entered, that is, if there is no reference point information, the retrieval operation is carried out using all the indexes 10 to 17.

In the present information retrieval system, it may be contemplated that update is carried out for the same document astride (over) a plurality of divided index sections such that index data for the same document is stored in a plurality of temporally different Indexes. In such case, the same document(s), each having a high score, would be detected in duplication as being the results of retrieval. It is possible in such case to have the retrieval unit 3 rearrange the same document in the retrieved results in accordance with a preset priority reference. For example, priority may be put on the retrieved results obtained with the new index(es) (that is, on the index(es) lying on the left side in FIG. 4) to overcome the above inconvenience.

It is now assumed that a reference point information has been entered as the retrieving condition and, for example, a request for retrieval has been made for reproducing the retrieved results at the time of two days before, that is, on 200X/Y/N–2. In this case, the retrieving processing is carried out based on the index state of 200X/Y/N–2. The retrieval unit 3 thus selects the indexes of the Index 12 for 200X/Y/N–2 and older.

That is, the Index 10 in which the latest update (the information as from 200X/Y/N) has been registered is not read in, while the Index 11 in which the information one day before (200X/Y/N–1) has been registered, is also not read in, and the remaining indexes are selected for retrieval.

In this case, as in the case where the reference point information has not been entered, the retrieval unit 3 may rearrange the same document in the retrieved results, in accordance with the preset priority reference, to reflect the so rearranged result in the retrieved result.

In the foregoing, the operation for retrieving processing with the present information retrieval system has been briefly described. It should be noted that, for example, in specifying the retrieving time point in step S102, not only the reference point information but also the time range (starting time to ending time) may also be arranged to be set. In this case, the retrieval unit 3 selects the index or indexes, associated with the time interval specified, as being the subject for retrieval.

For example, if a time range of from 200X/Y/N−1 until 200X/Y/N−3 is specified, the retrieval unit 3 operates so as to select the Indexes 11 to 13 as the subject for retrieval.

To effect information retrieval, using the divided indexes, obtained on dividing the index into a plurality of divided Index sections along the time axis, the processing of indexing the information of the subject for retrieval is needed. The preparatory processing for this indexing is now described.

Figure 5:
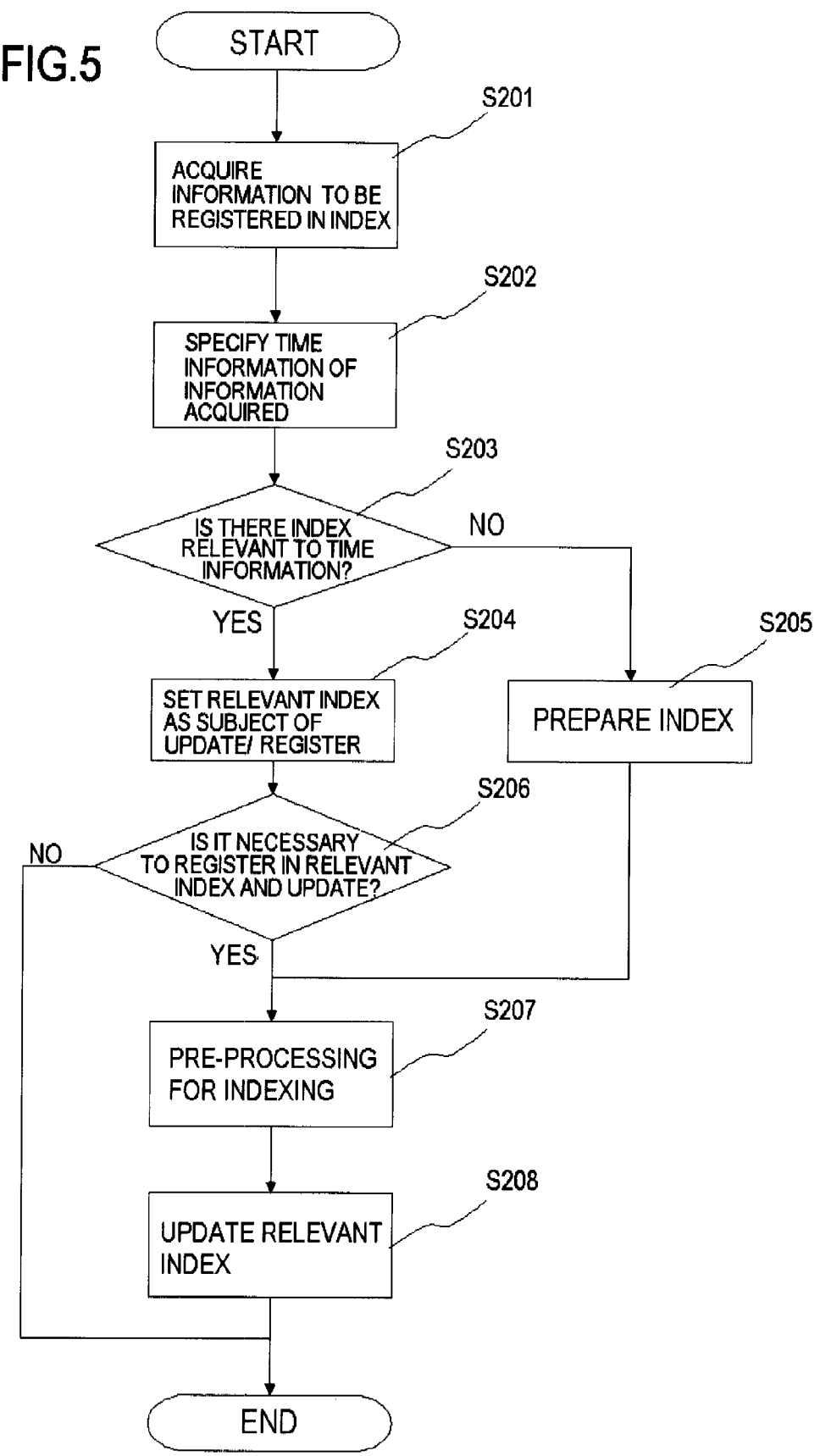
FIG. 5 is a flowchart for illustrating a sequence of operations for registering information as a subject for retrieval of an index registering unit of FIG. 1 in an INDEX.

FIG. 5 depicts a flowchart for illustrating a sequence of operations as from acquisition of the information of the subject for retrieval until registration thereof in the index by the index registering unit 2 (index registration device). Reference is now made to the flowchart of FIG. 5.

Initially, the information acquisition unit 21 acquires, from the information storage section 1, the information of the subject for retrieval which is to be registered in the index (step S201). This information is referred to below as 'information to be newly registered'. It is also possible for the information storage section 1 to transmit the information to be newly registered to the information acquisition unit 21.

The time information specifying unit 22 then specifies the time information of the above-mentioned information to be newly registered (step S202).

The method for specifying the time of the information to be newly registered may be enumerated by (A) a method of using the time-related meta-information ancillary to the information to be newly registered;
(B) a method of using the time-related meta-information registered in the information storage section 1 or in other information management system in a state correlated with the information to be newly registered;
(C) a method of utilizing the time-related information written in the information to be newly registered;
(D) a method of estimating the time from the information stated (written) in the information to be newly registered;
(E) a method of utilizing the time at which the information to be newly registered was acquired from the information storage section 1 by the information acquisition unit 21; and
(F) a method of setting the time of actually performing registration processing for the index as the time information.

The time information specifying unit 22 delivers the time information, specified by any of the methods identified in (A) to (E) above, and the information to be newly registered, to the index update unit 23.

The index update unit 23 confirms whether or not there is an index in the index storage section 100 relevant to the time information specified in the step S202 (step S203).

If the confirmed result indicates that there is no index relevant to the time information specified (NO branching in the step S203), the index update unit 23 prepares an index relevant to (indicative of) this time information and sets the index as an index as a subject for updating (step S205).

If conversely the confirmed result indicates that there is the index relevant to the time information specified (YES branching in the step S203), the index update unit 23 sets the index to be an index as a subject for updating or registering the information to be newly registered (step S204).

The index update unit 23 then checks to see whether or not it is necessary to update or register the information to be newly registered in the index as the subject for updating (step S206).

The index update unit 23 then confirms whether or not, in the index, set to be a subject of updating or registration in the step S204, there is the information registered in the index, that is, the information for which the information for specifying the information sort is coincident with the information to be newly registered. It should be noted that, as the information for identifying the information sort, the file paths or URI (Uniform Resource Identifier) may be used. Another example of the information for identifying the information sort is a file ID afforded by another information system.

Should there be no information in the index which is coincident with the information to be newly registered (YES branching of the step S206), the processing of a step S207 ff. is carried out. If there is the information in the index which is coincident with the information to be newly registered, but the information to be newly registered is more recent than the time information of the registered information, as verified on comparing the time information of the registered information to the information to be newly registered (YES branching of the step S206), the processing of the step S207 ff. is carried out.

If conversely the information to be newly registered is older than the registered information, the processing from the step S207 ff. may be omitted (NO branching of the step S206). If the information retrieval system is managed so that, if the information to be newly registered is older than the time information of the registered information, but a plurality of the same information will be registered in the index, the processing from the step S207 ff. may be carried out. In this case, the processing of the step S207 ff. is omitted only in case the information to be newly registered is concurrent as the time information of the registered information.

The index update unit 23 then performs pre-processing for registration in the index (step S207). An example of preparing an index of a document by an inverted file method, as one of the indexing techniques, is now described. This pre-processing includes the following processings.

A document as a subject for retrieval is read out to extract a text.

A retrieval word to be registered in the index is extracted from the text.

The position of occurrence of the retrieval word and the number of times of the occurrences etc. are recognized.

The inverted file is re-arrayed so that the retrieval words are arrayed in the ascending order.

Other details of the indexing method are disclosed in literature including Non-Patent Document 1 and hence are omitted, which is incorporated herein by reference.

Finally, the index update unit 23 updates or registers the information to be registered in the index, which has become apparent by pre-processing, in the index selected (step S208).

More specifically, should there be no information of the document, as the subject of retrieval, in the selected index, the index update unit 23 newly adds the information. Should there be the information of the document, as the subject of retrieval, in the selected index, the index update unit updates the index.

The time range information, registered in the index, may also be preferably set, although the corresponding explanation has not been made in the foregoing. For example, if too far future time such as 3000 A.D. or the too ancient past time has been identified as the time information in the step S202, retrieval may be terminated without newly preparing the index in the step S205, without registering the subject information in the index.

It is of course also possible to prepare an index associated with the far future time or too old past time and to register the index. In this case, such an information retrieval system may be obtained in which it is possible to efficiently retrieve backup data of such as ancient documents or a document which it is not possible to retrieve under the retrieving condition devoid of the reference point information.

The present information retrieval system allows for handling different from that of the routine information retrieval system. Deletion of the information of the subject for retrieval from the index is now described with reference to FIG. 5.

The new preparation and updating are the same as those described above. As for deletion, the time information for the delete event (time point of deletion) is identified (step S202), and the fact of deletion of the information of interest is stated in the index relevant to the time information (time point of deletion), by way of update processing. As for the method for identifying the time information for the delete event, the time of notification from the information storage section 1 or the time point of confirming the absence of the information at the scroll time may be used as the time information.

In more detail, if the time information for the delete event is included within a time range ascribed to the index that holds the deleted information, such index is deleted. For other indexes having the different time information, the information indicating the deletion of the relevant information is registered in the index, thereby achieving the processing of deletion. Thus, the processing for deletion differs from complete deletion from the index as is done in the routine information retrieval system.

The foregoing is the basic formulation of the present exemplary embodiment as well as its operation. It should be noted that an optimum method for index preparation may be selected depending on the use and the size of the information retrieval system, while other changes may be made. For example, the information included in any information storage sections other than the information storage section 1 may be added as the subject for retrieval of the information retrieval system. In this case, it is sufficient that the information storage section 1 is replaced by other information storage sections in the processing of index registration shown in FIG. 5.

In the present exemplary embodiment, the time range indicative of (represented by) each index is managed by components of the present exemplary embodiment, such as index storage section 100 or index update unit 23 Alternatively, a database for managing the time range represented (or allocated) by each index may also be provided separately.

In the exemplary embodiment of FIG. 2, the index is divided on the daily basis. However, the time range (or interval) allocated by the individual indexes may differ from one another. For example, the time range (interval) may be a day for a time period as from the current time until one week before, and one month for a time period before the first-stated time period. The index division need not be fixed but may be varied depending on the index size. For example, such management may be possible in which, when the index latest at the time of processing for registration has exceeded a predetermined size, a more recent index is prepared.

Index division (preparation of a new index) may be carried out within the flow of processing of the above-mentioned index registration. Alternatively, the index division may be executed as an event in response to a notification from some other means.

For example, if index division is carried out at 0:00 a.m. each day, means for forwarding a notification requesting index division may be separately provided and the notification may be sent to means in charge of division processing. The index for time before 0:00 a.m. of yesterday (for example, the Index 10 of FIG. 2) becomes a past index (for example, the Index 11 of FIG. 2), and a new index 10 is newly prepared.

It is not mandatory for the index update unit 23 to carry out the processing of preparing the index, such that a means dedicated only for division of the index may be provided separately.

With the present exemplary embodiment, described above, the chronological retrieving function of selectively using the indexes divided from one another on the time axis may be used as from the time directly following the completion of the processing for index registration. In other words, it is readily feasible to newly introduce an information retrieval system provided with the chronological retrieving function or to boot a pre-existing information retrieval system upon adding a new information storage section.

Second Exemplary Embodiment

An information retrieval system, provided with a function of the backup data index update/registration, according to the present invention, is now described in detail with reference to the drawings.

Figure 6:
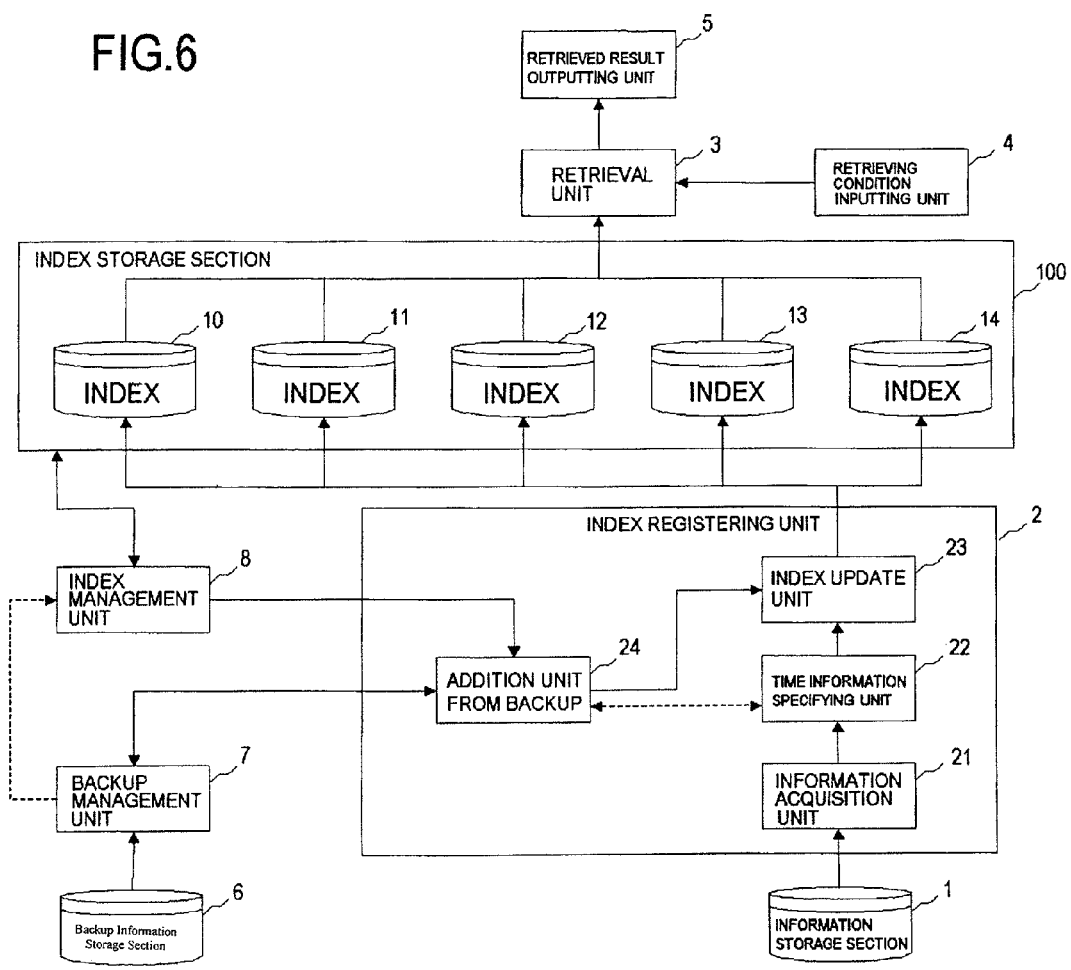
FIG. 6 is a schematic view showing a formulation of an information retrieval system according to a second exemplary embodiment of the present invention.

FIG. 6 depicts a diagram showing a formulation of an information retrieval system. Referring to FIG. 6, the information retrieval system of the present exemplary embodiment includes an information storage section 1, an index registering unit 2, a retrieval unit 3, a retrieving condition inputting unit 4, a retrieved result outputting unit 5, a backup information storage section 6, a backup management unit 7, an index management unit 8 and an index storage section 100.

The information storage section 1, retrieval unit 3, retrieving condition inputting unit 4, retrieved result outputting unit 5 and the index storage section 100 are the same as the corresponding components of FIG. 1 and hence their description is omitted here.

With the index registering unit 2, an addition unit for addition from backup 24 is added to the information acquisition (accepting) unit 21, time information specifying unit 22 and the index update unit 23 in the index registering unit 2 of the first exemplary embodiment.

The addition unit from backup 24 acquires the information to be registered in an index, in the same way as does the information acquisition (accepting) unit 21. However, the addition unit from backup differs from the information acquisition (accepting) unit in acquiring the information to be registered in the index from the backup management unit 7 and in requesting the index update unit 23 to update the index.

To which of the indexes the addition unit from backup 24 makes a request for updating is determined by the index division information (splitting state) obtained from the index management unit 8 and from the time information of the information obtained from the backup management unit 7. It is presupposed that, as the time information of the information obtained from the backup management unit 7 and registered as the subject for retrieval, the time information ancillary to the information of the backup management unit 7 is directly used. It is however also possible for the time information specifying unit 22 to specify the time information and return it to the addition unit from backup 24.

The backup information storage section 6 is a recording medium, a recording device and a recording system as a storage destination of the backup data prepared by the backup management unit 7. Specifically, the backup information storage section is made up of a memory, a magnetic disc, a magnetic tape or an optical disc.

The backup management unit 7 has the function of preparing, managing and restoring data for saving in any (arbitrary) data state (backup data). The data from which the backup data is prepared may be data stored in the information storage section 1 of FIG. 6 or data of another information system.

Specified examples of the backup management unit 7 include a version management software, such as CVS (Concurrent Versions System), and a software or device that has the function of saving the changed contents along the time axis whenever data is updated such as CDP (Continuous Data Protection). Other specified examples include a system termed Internet Archive that saves past states of Web pages (http://web.archive.org/), a software that plays the role of writing the backup data on a magnetic tape, a variety of backup software items for commercial use, a snapshot implemented by NAS (Network Attached Storage) and database management software or a file system that includes a journal log.

The operation of the index management unit 8 is now briefly described. The index management unit 8 accesses one or a plurality of indexes of the index storage section 100 and merges the indexes to form a sole index.

To provide for a proper state of division of the indexes, the index management unit 8 newly prepares an index for a new time range (or interval), or merges the indexes as time elapses.

The index management unit 8 has the function to deliver the information such as the state of division of the indexes to the addition unit from backup 24.

The index management unit 8 also plays the function to newly prepare an index in accordance with the state of the information space that may be restored by the backup management unit 7. There are cases where, in case the backup management unit 7 prepares and holds the backup every week, it is desired to unify the state of division of the indexes and the state of the backup data to each other. In such case, the index management unit performs the role to acquire the information from the backup management unit 7 to manage the indexes in accommodation with the so acquired information.

If the index preparing system by the inverted file system is taken as an example, merging the indexes is unifying a plurality of indexes of the same document into one leaving the latest index, whereupon a plurality of inverted files are rendered a sole inverted file.

It is envisaged that the processing of merging the indexes is performed under one or more of the following conditions:
the number of the indexes obtained on division exceeds a preset number;
the volume of the indexes obtained on division exceeds a preset volume; and
the indexes obtained on division have become older than a predetermined period.

The speed of the information retrieving processing may be increased by merging the indexes by the index management unit 8.

The reason is that, by merging the indexes, it is unnecessary to retrieve the indexes of the same document a number of times, thereby improving the efficiency proper to the retrieving processing.

The processing of retrieving and the processing of index updating/index registration from the information storage section 1 in the present exemplary embodiment are the same as those of the first exemplary embodiment. Hence, the corresponding description is dispensed with, and the processing of addition and updating of the indexes for the backup data, added by the present exemplary embodiment, is now described.

Figure 7:
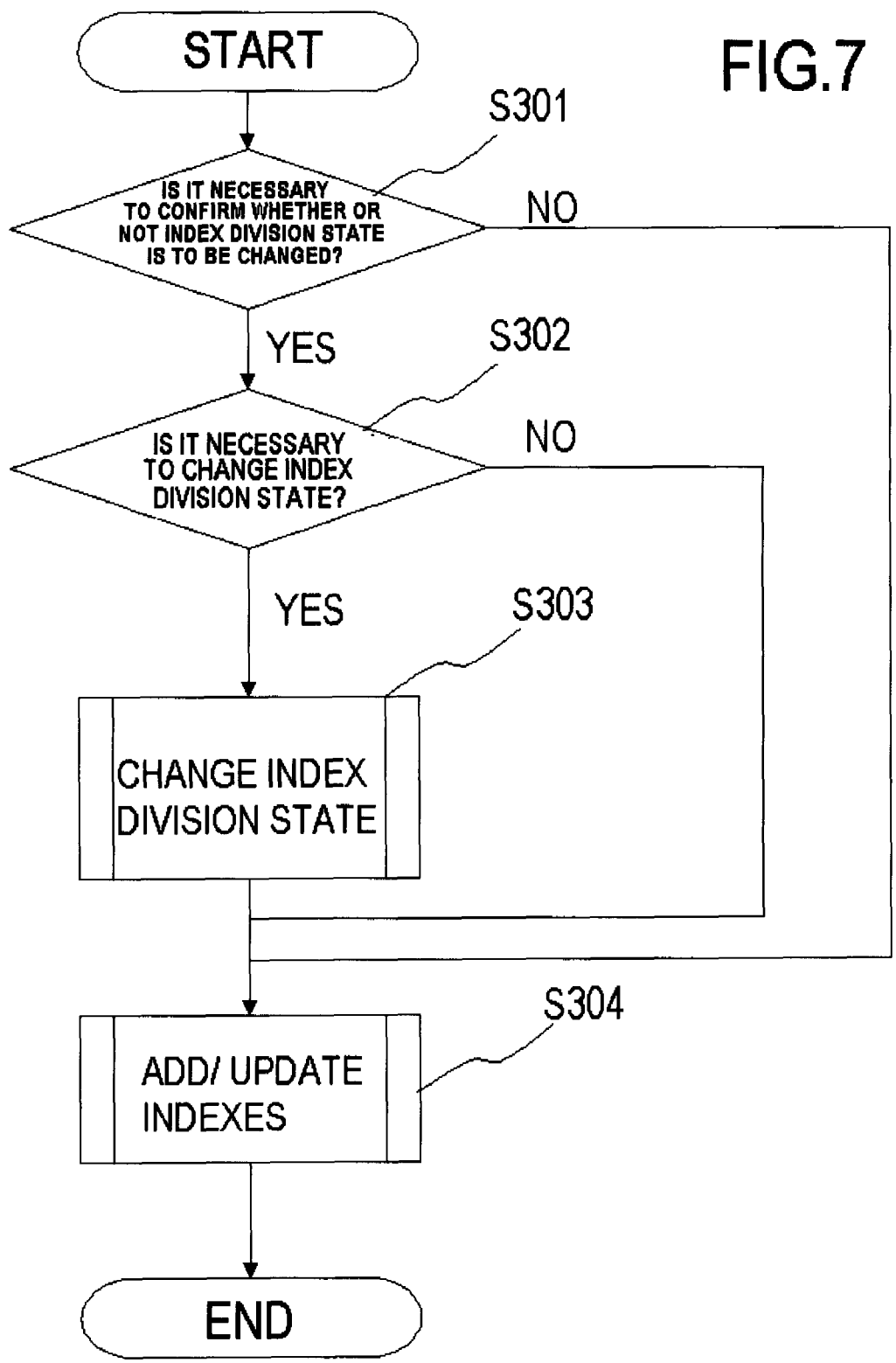
FIG. 7 is a flowchart for illustrating schematics of a processing for index registration of backup data in the information retrieval system according to the second exemplary embodiment of the present invention.

FIG. 7 depicts a flowchart showing a schematics of a processing for index registration, of backup data in the information system of the present exemplary embodiment inclusive of pre-processing.

Referring to FIG. 7, the addition unit from backup 24 initially decides on whether or not it is necessary to confirm if it is necessary to change the state of division of the current indexes (step S301). This decision may be made by having reference to the contents as entered at the outset by a manager of the information retrieval system to e.g. a setting file, or by receiving an entry of the manager.

Alternatively, the above decision may be made in accordance with a preset rule. This rule may be such one in which, if the backup data is previously used for index registration, the state of division is not changed, in a majority of cases, and hence the confirmation is not made (NO branching of the step S301).

In case of NO branching in step S301, processing transfers to backup data index addition and update (step S304). The index addition and update processing will be described subsequently.

If it is found in the step S301 that the decision on whether or not it is necessary to change the state of division of the current index (YES branching of the step S301), the index management unit 8 acquires the granularity of the chronological retrieving function to be implemented. The index management unit then compares the granularity to the state of the index division to give a decision whether or not it is necessary to change the state of the index division (step S302).

The division state of the index(es) which is one party of comparison in the step S302, is as follows in, e.g., FIG. 2. That is, the information in which the current time (200X/Y/N) is taken charge of by (allocated to) the Index 10, and the time range as from 200X/Y/N−1 until 200X/Y/N is taken charge of by (allocated to) the Index 11, for instance.

This division state of the indexes may be acquired by the index management unit 8 having reference to the index storage section 100. It is also possible for the index management unit 8 to save the information on the division state and to refer to the information in the step S302.

The granularity of the chronological retrieving function to be implemented, as the other subject for comparison, means the time unit that may be specified by the chronological retrieving function. For example, if the function of retrograding on the daily basis is needed, it is necessary to form the indexes by division on the daily basis.

The granularity of the chronological retrieving function to be implemented may be entered by e.g. a system manager at a time point of the step S302. Alternatively, the information recorded in advance in the setting file may be used. Still alternatively, the granularity of the chronological retrieving function may be determined using the granularity of the restoration information (backup interval etc.) that may be provided by the backup management unit 7.

If the granularity of the restoration information (e. g. backup interval) that may be provided by the backup management unit 7 is utilized, the index management unit 8 acquires the information from the backup management unit 7. The state of the information may directly be reflected in the division state of the indexes for retrieval. Alternatively, the granularity of the chronological retrieving function may be determined from the granularity of the restoration information, such as backup interval.

For example, if the management by the backup management unit 7 is based on combination of the full backup and the difference backup, granularity of the chronological retrieving function may be determined by a rule that the timing of the full backup is used as the granularity of the restoration information. For example, if the management of the full backup by the backup management unit 7 is such that full backup is taken every week, the granularity of the chronological retrieving function is determined on the week basis.

The index management unit 8 compares the state of index division to the granularity of the chronological retrieving function to be implemented. If the index division is greater than the granularity of the chronological retrieving function, the degree of precision in case of retrieval with designation of the reference point becomes coarser. It is thus determined that a finer index division is to be used (YES branching of the step S302).

If conversely the state of index division satisfies the granularity of the chronological retrieving function to be implemented, the index management unit 8 verifies that the state of index division need not be changed. The index management unit accordingly proceeds to step S304 (NO branching of the step S302).

If, as a result of comparing the state of the index division to the granularity of the chronological retrieving function to be implemented, the index division is smaller than the granularity of the chronological retrieving function, it is unnecessary to change the state of the index division. However, this is not necessarily the case if the setting is such that, in adding an index that uses backup data, the granularity of the chronological retrieving function is to be unified to the state of the index division, such that a decision may be made to set the indexes to a coarser division state (YES branching of the step S302).

Suppose that, in the index storage section 100, there are two indexes, namely an index for today and an index for a period as from start of management until yesterday (, assumed that this period exceeds one week). Also, suppose that a week-based chronological retrieving function is to be implemented with the use of backup data. It is then determined that the index for the period as from start of management until yesterday, which period is to exceed one week, is to be divided.

If, in the step S302, it has been determined that the state of index division is to be changed (YES branching of the step S302), the index management unit 8 merges the indexes or prepares a new index to change the state of index division in accordance with the granularity of the chronological retrieving function to be provided (step S303). The processing of changing the state of index division is explained subsequently in detail.

After changing the state of index division, the index management unit 8 adds or updates an index for backup data (step S304). The processing for adding/updating the index is explained subsequently in detail.

[Processing for Changing the State of Index Division—Case 1 (Newly Introducing an Index)]

Such a case in which index division is not proper when introducing a new index of backup data, is taken up for explanation.

In this case, it is sufficient that the index management unit 8 newly prepares an index which is divided so that indexes in their entirety will be divided to the same granularity as that of the chronological retrieving function.

Figure 8:
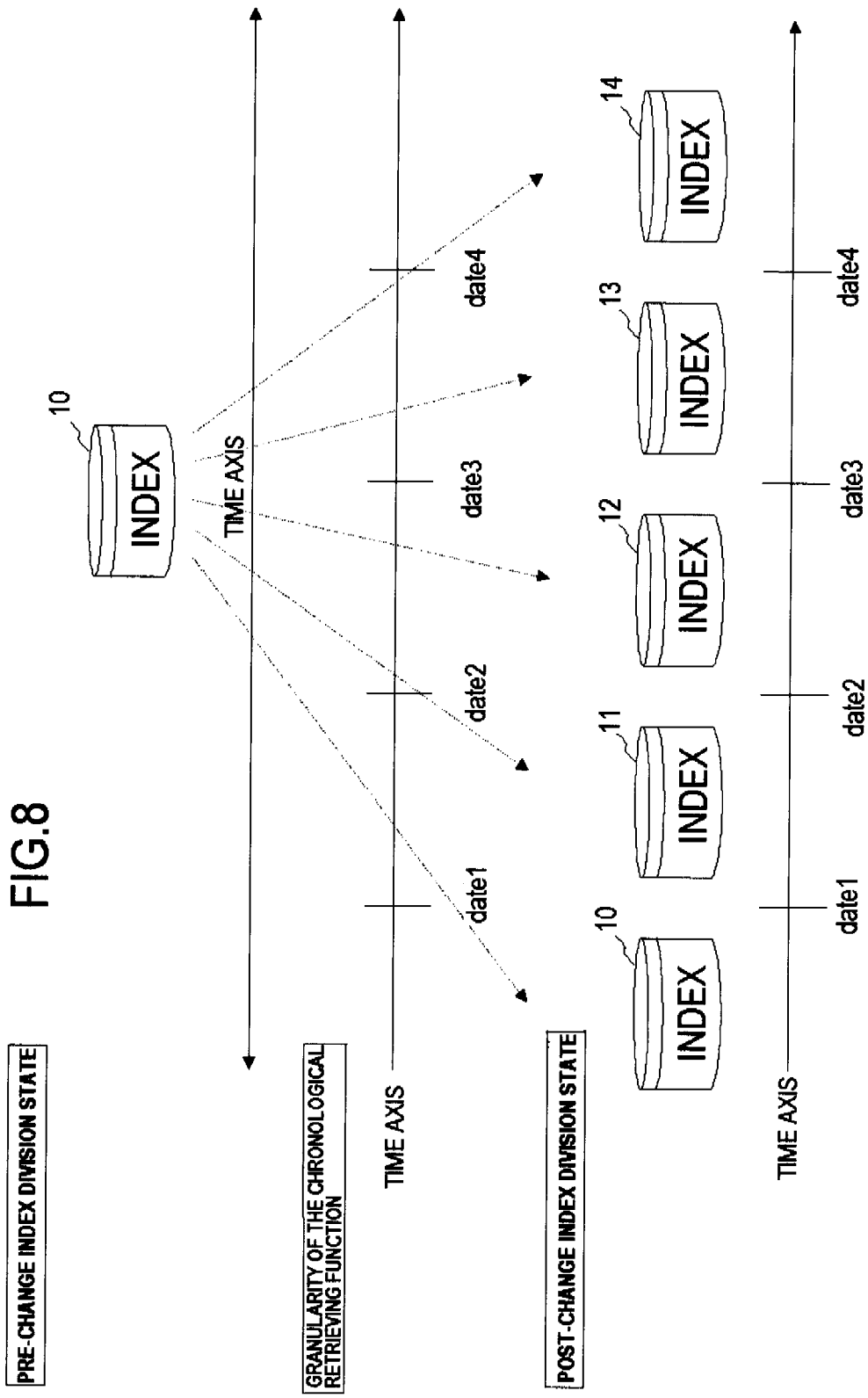
FIG. 8 is a schematic view for illustrating an operation of an index management unit in the information retrieval system according to the second exemplary embodiment of the present invention (case 1).

FIG. 8 shows the operation of the index management unit 8 as from the state in which prevailing index division is not proper when introducing a new index.

An upper part of FIG. 8 shows the original state of indexes in which the time axis of the subjects for retrieval is taken charge of by the sole Index 10.

In a mid part of FIG. 8, date1, date2, date3 and date4, entered on the time axis, represent time points that may be specified by the chronological retrieving function. In case the granularity of the chronological retrieving function is to be the same as the backup interval of the backup data that may be provided by the backup management unit 7, date1, date2, date3 and date4 are equivalent to the backup time of the backup data.

In a lower part of FIG. 8, the result of division of the Index 10, which is in keeping with the granularity of the chronological retrieving function, is shown. The index division is such that the Index 10 takes charge of a time interval as from the latest state until date1, the Index 11 takes charge of a time range as from date1 until date2, and so forth.

Meanwhile, if the original Index 10 is void, it is sufficient to simply prepare void indexes 11 to 14.

If the index data are contained in the Index 10, it is sufficient that the Indexes 11 to 14 are newly prepared, while the index data of the original Index 10 is directly made a new Index 10. In this case, the indexes of the information of the subject for retrieval which temporally precedes date1 and which is to be stored in the Indexes 11 to 14 keep on to be left in the Index 10. However, this is not inconvenient for usual retrieval which does not specify the reference point.

Suppose that, in the case of the chronological retrieving function that retrogrades to a past time point, the information in the Index 10 is not used, the backup interval in the backup management unit 7 is the same as the granularity of the chronological retrieving function, and the subject of backup of the backup management unit 7 and the backup information storage section 6 is in the information storage section 1. In this case, the index of the information of the subject for retrieval outside the time taken charge of the Index 10 is properly registered in the Indexes 11 to 14 in the course of the next index addition/registration of a step S304 as later explained without affecting the chronological retrieving processing.

In case of performing retrieval in which the gamut of retrieval is specified to be the time range (zone) taken charge of by the Index 10, the old information stored in the Index 10 is included in the results of retrieval. As a first countermeasure, the information outside the time thus taken charge of may be removed in the course of the retrieving processing by the retrieval unit 3.

As a second countermeasure, the index management unit 8 in the course of the processing for changing the state of index division of the step S303 may delete the information in the Index 10 outside the time range thus taken charge of, using the time-related meta-information allocated to the information. As a result of this processing for deletion, the overhead of the processing of eliminating the information outside the time range thus taken charge of may be removed in the course of the retrieval processing in accordance with the first countermeasure, described above, thus improving the performance. In addition, the capacity of the Index 10 may be reduced.

In taking the second countermeasure, the index management unit 8 may allocate the information in the Index 10 to the respective Indexes 10 to 14, in accordance with the time information of the information of the subject of retrieval as stored in the Index 10. More specifically, the information as the subject of retrieval, stored in the Index 10, is taken out. Then, using the time-related meta-information, ancillary to respective information, the information, thus taken out, may be allocated to the Indexes 10 to 14 taking charge of respective time ranges. The time information may also be specified, using the time information specifying unit 22, so as to be used by the index management unit 8.

However, it may occur that the backup interval of the backup data that may be provided by the backup management unit 7 is the same as the granularity of the chronological retrieving function, and the subject of backup in the backup management unit 7 and that in the backup information storage section 6 are in the information storage section 1, that is, the entire information outside the time range taken charge of, as stored in the Index 10, is in the backup information storage section 6. In such case, the index information to be allocated to the Indexes 11 to 14 is registered in the course of the next index adding/update processing in a step S304 as described in detail subsequently. It is therefore possible to make deletion without index registration.

If conversely the above condition is met, the processing for index registration at this time point may be carried out to dispense with the processing for registration at the time of the next index adding/update processing in a step S304 as described in detail subsequently.

[Processing for Changing the State of Index Division—Case 2 (Index Division being Synchronized with Granularity)]

A case where the original index division state is not same as but is synchronized with the granularity of the chronological retrieving function is now described.

Figure 9:
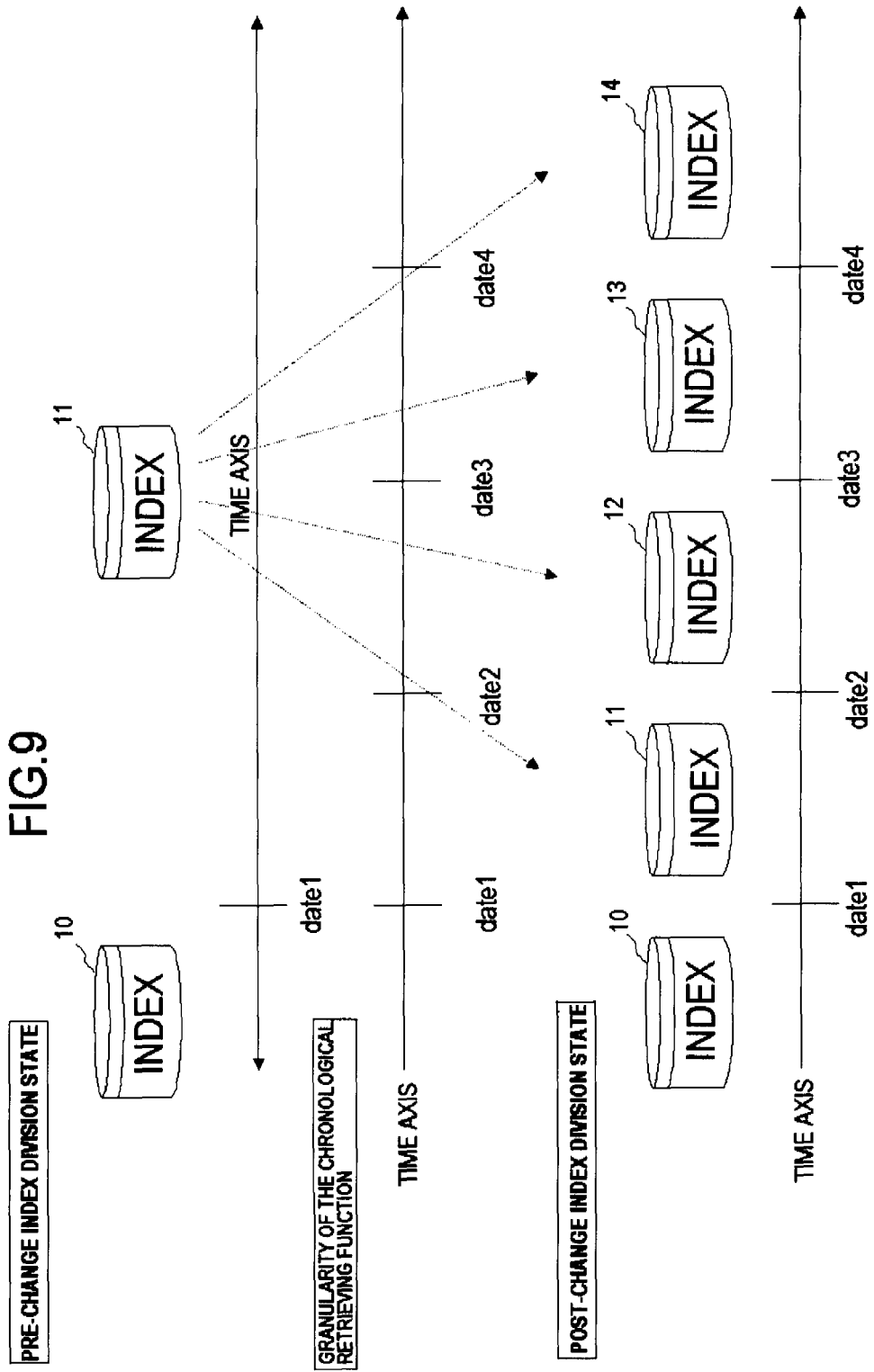
FIG. 9 is a schematic view for illustrating an operation of the index management unit in the information retrieval system according to the second exemplary embodiment of the present invention (case 2).

FIG. 9 is a schematic view for illustrating the operation of the index management unit 8 as from the state in which the index division has been made at the time of introducing an index but the state of index division is not the same as the granularity of the chronological retrieving function to be implemented.

An upper part of FIG. 9 shows the original index state. The Index 10 takes charge of the time as from the latest time until date1 and the Index 11 takes charge of the entirely of the remaining time ranges.

Mid and lower parts of FIG. 9 are the same as those of FIG. 8. In this case, the original Index 10 is usable as is and hence is not changed. For the original Index 11, the processing equivalent to that carried out for the original Index 10 of FIG. 8 is carried out. That is, the Index 11 is used directly as the Index 11, and only the time range to be allocated is changed. The Indexes 12 ff. are newly prepared.

Meanwhile, the information in the Index 11 may directly be allocated to the Indexes 12 to 14, in accordance with the respective time information of the information as the subjects for retrieval as stored in the Index 11.

Figure 10:
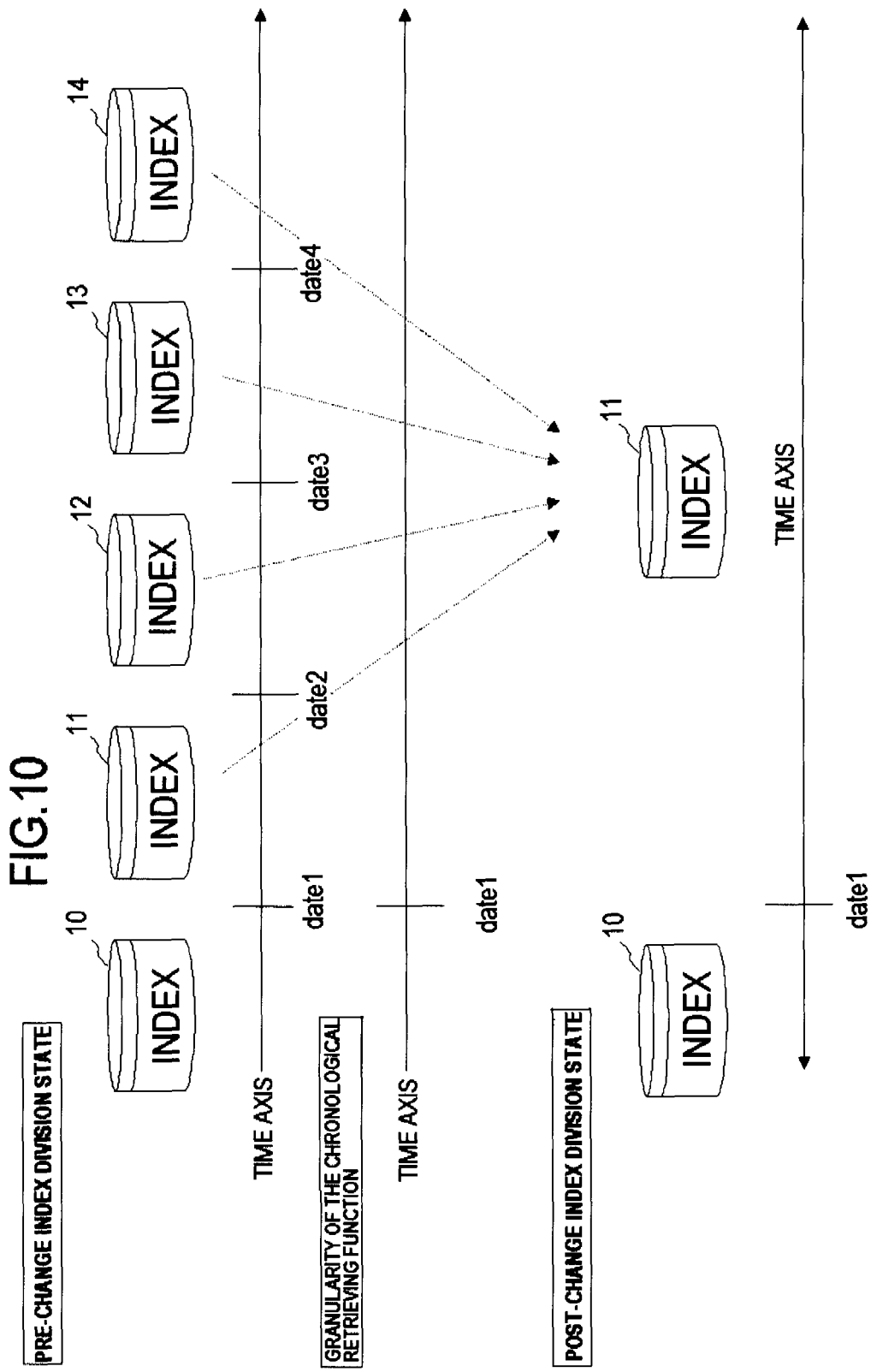
FIG. 10 is another schematic view for illustrating an operation of the index management unit in the information retrieval system according to the second exemplary embodiment of the present invention (case 2).

If the state of index division is finer than the granularity of the chronological retrieving function, a plurality of indexes may be merged together into one, based on the merge function of the index management unit 8, as shown in FIG. 10. If this merging is not carried out, there is no problem caused in the operation. However, the performance is improved to advantage if the merging is carried out.

[Processing for Changing the State of Index Division—Case 3 (Index Division being not Synchronized with Granularity)]

A case where the original index division state is neither the same as nor synchronized with the granularity of the chronological retrieving function is now described.

Figure 11:
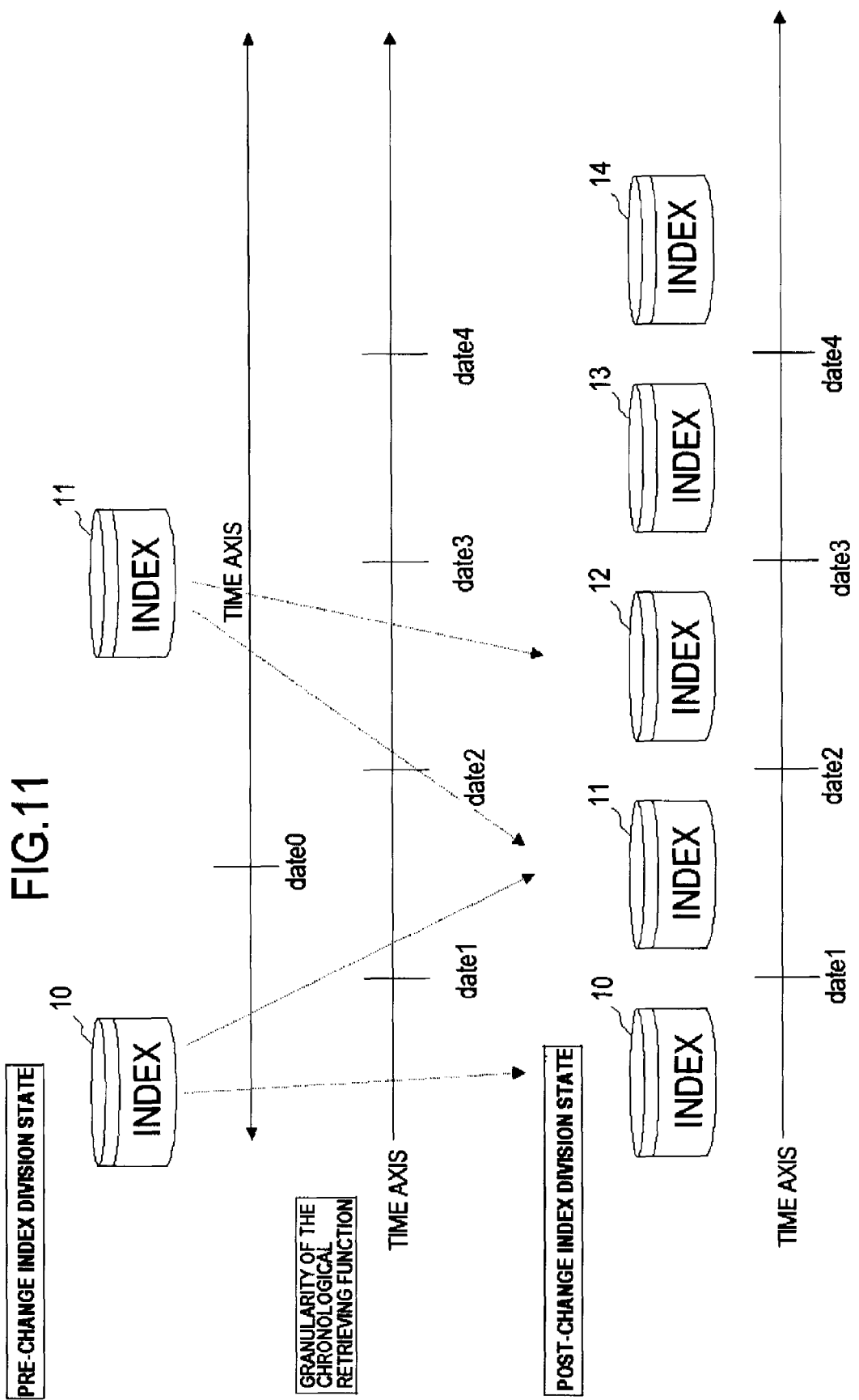
FIG. 11 is a schematic view for illustrating an operation of an index management unit in the information retrieval system according to the second exemplary embodiment of the present invention (case 3).

FIG. 11 is a schematic view for illustrating an operation of the index management unit 8 as from the state in which the index division has been made at the time point of introducing an index but the state of index division is not the same as the granularity of the chronological retrieving function to be implemented.

An upper part of FIG. 11 shows the original index state. The Index 10 takes charge of the time as from the latest time until date0 and the Index 11 takes charge of the entirely of the remaining time ranges as from date0.

Mid and lower parts of FIG. 11 are the same as those of FIG. 8. In this case, the original Index 10 may directly be used as the post-change Index 10, while the index information in the original Index 10 may not be allocated to the Index 11, in the same way as in the case 1. Or, the index information may be allocated to the Indexes 10 and 11, using the time-based meta-information ancillary to the information for retrieval in the original Index 10, as explained with reference to the case 1.

The original Index 11 may directly be used as the as-changed Index 11, while as-changed Indexes 12 ff. may be newly prepared. Or, the index information may be allocated to the Index 11 and to the Indexes 12 ff, using the time-related meta-information ancillary to the subjects for retrieval in the Index 11.

Meanwhile, in case the index information of the original Index 10 is allocated, the information of the same document is present in duplication in the new Index 11. It is sufficient in this case that, as for the information of the same document, competing in the Index 11, the index information owned by the more recent Index 10 may be left in the Index 11.

Figure 12:
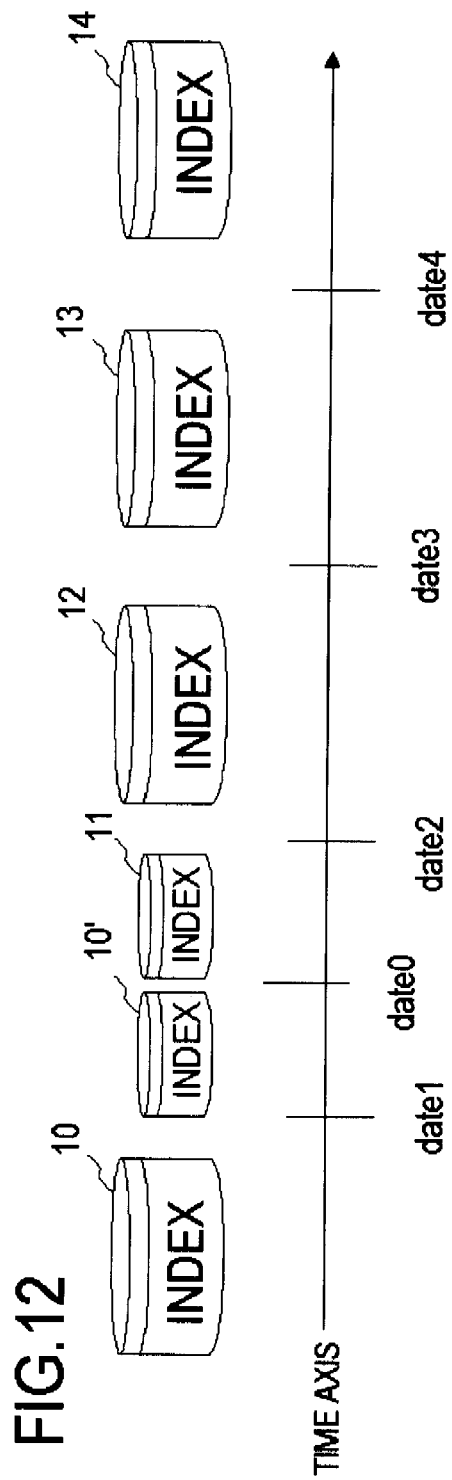
FIG. 12 is a schematic view for illustrating another operation of the index management unit in the information retrieval system according to the second exemplary embodiment of the present invention (case 3).

The as-corrected state of index division may be as shown in FIG. 12. In the example of FIG. 12, a division reference point of date0 is provided between date1 and date2, and Indexes 10', 11 are separately provided. The index information of the original Index 10 is allocated to new as-changed Indexes 10 and 10', while the index information of the original Index 11 is stored in the as-changed new Indexes 11 to 14.

With the formulation of FIG. 12, date0 may be used as the reference point of the chronological retrieval. There is also accrued a merit that it is unnecessary to carry out the processing in case of overlapping of the information of the same document described above.

[Processing of Deleting/Updating an Index]

Figure 13:
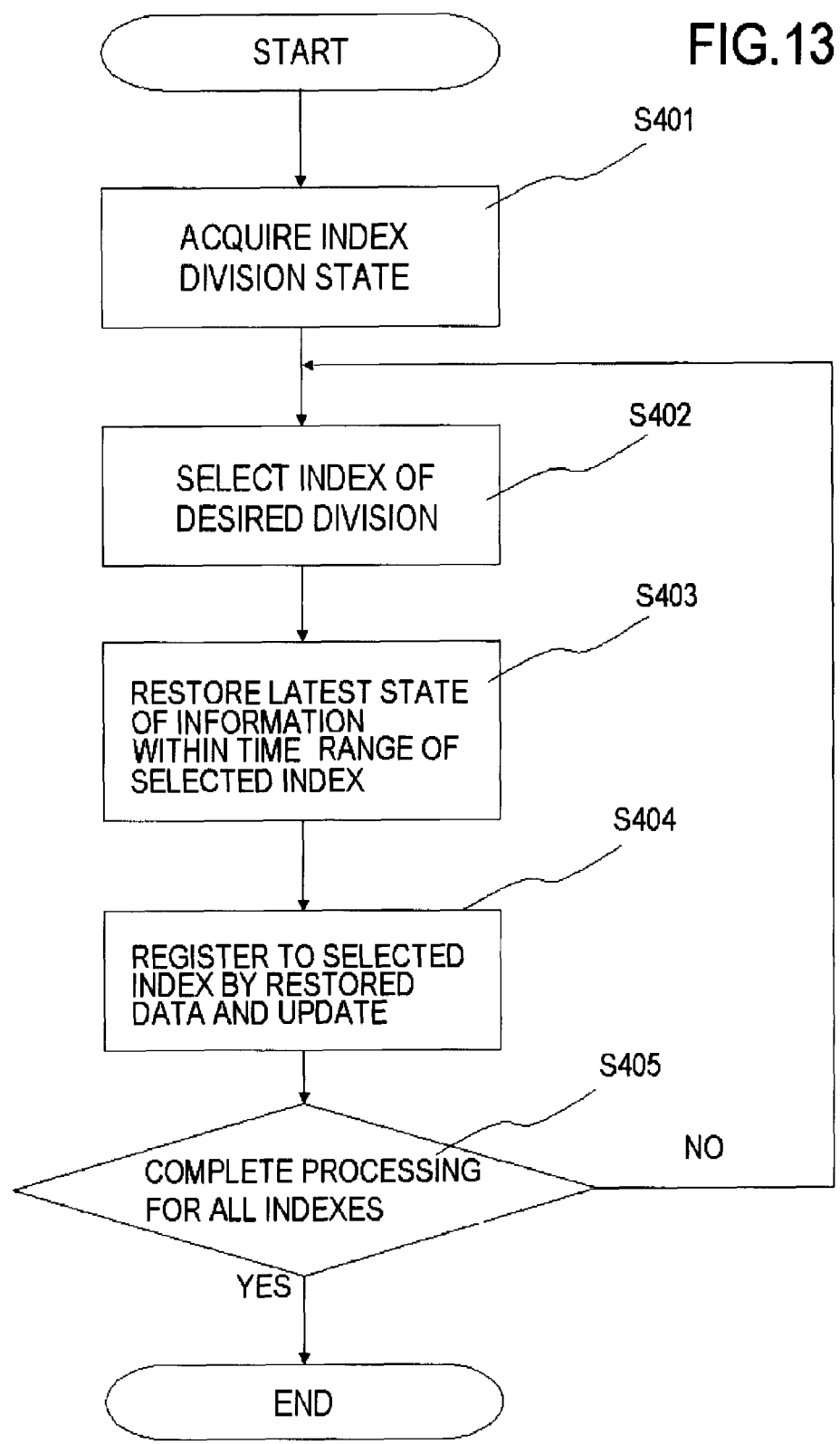
FIG. 13 is a flowchart for illustrating a processing for adding and updating an index from backup in the information retrieval system according to the second exemplary embodiment of the present invention.

The processing for index registration and updating, in the step S304 of FIG. 7, is now described in detail with reference to the drawings. FIG. 13 depicts a flowchart showing an example of processing of index addition/updating from backup in the information retrieval system of the present exemplary embodiment.

Referring to FIG. 13, the addition unit from backup 24 selects the information on the state of index division (step S401). This processing may be omitted if the addition unit from backup 24 has already acquired the information on the state of index division.

The addition unit from backup 24 then selects the index to be updated (step S402). The sequence of selection may be at random, from a new index or from an old index, as desired.

The backup management unit 7 then restores the information (set of information) at the latest time point within the time range taken charge of by the index as selected by the addition unit from backup 24 (step S403).

The index update unit 23 registers or updates the information (set of information) restored by the addition unit from backup 24 in the index selected in the step S402 (step S404).

It may occur that the information, verified to be the information of the same sort as the information to be registered, such as the information having the same file path as the information to be registered, is present in the index selected. In such case, it is possible to apply the priority references in the same way as explained with reference to the first exemplary embodiment. As an example, the time-related meta-information of the information stored in the index may be compared to the time information of the backup data, the time-related meta-information ancillary to the backup data or the time information specified by the time information specifying unit 22 to register a more recent one in the index.

In making the above decision, such rules as unconditionally putting priority to restored data from backup data, or to data stored in the index, may be set and used.

If the processing for index registration of the restored information (set of information) has come to a close in the step S404, the addition unit from backup 24 verifies whether or not the processing of all indexes has come to a close (step S405).

If the processing for all of the indexes has come to a close, the processing of index updating comes to a close (YES branching of the step S405). If the processing for all of the indexes has not come to a close, processing reverts to the step S402 to select the index to be processed next (NO branching of the step S405).

By selecting all of the indexes and repeating the processing of S402 to S404, the registration of the backup data stored in the backup information storage section 6 in the relevant index comes to a close.

The basic sequence of operations for registering and updating backup data in the index has been described above with reference to FIG. 13. This sequence of operations may optionally be changed in accordance with the backup system used. For example, if a backup management system used is such a one in which the difference information (component) is applied as from the information of a given past time point to reproduce the information as the subject for restoration at such past time point, it is preferred to sequentially select the indexes in the step S402 beginning from the oldest index. The reason is that restoration data may be prepared by a method of applying the difference (component) to the previous restored data in the processing of restoration from backup data of the step S403.

Figure 14:
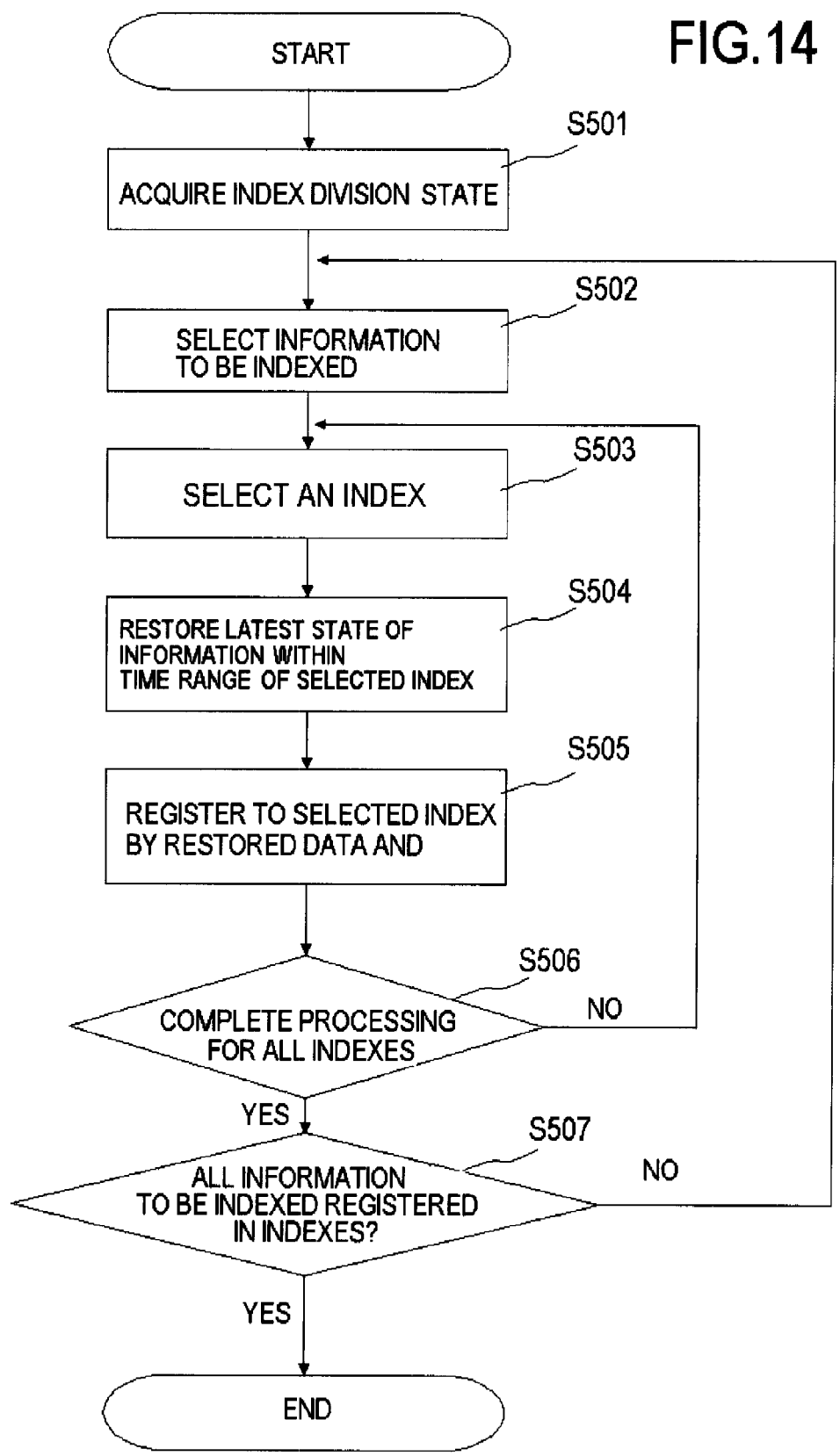
FIG. 14 is another flowchart for illustrating a processing for adding and updating an index from backup in the information retrieval system according to the second exemplary embodiment of the present invention.

As regards the index registration and update sequence, the processing sequence of FIG. 14 of initially selecting the information, for which indexes are to be prepared, may be used in place of the processing sequence of FIG. 13 of initially selecting the indexes as the subject of the processing.

A further example of the processing for index addition and update from backup data is now described with reference to a flowchart of FIG. 14.

Initially, the addition unit from backup 24 acquires the information on the state of index division (step S501). If the addition unit from backup 24 has already acquired the state of index division, the present processing may be dispensed with.

The addition unit from backup 24 then selects, from the backup management unit 7, the information to be registered in an index as being the subject for retrieval (step S502). The number of the information selected may be arbitrary, provided that such number lends itself to facilitated handling by the backup management unit 7 or by the addition unit from backup 24.

The addition unit from backup 24 then selects the index to be updated (step S503). The sequence of selection may be at random, from a new index or from an old index, as desired.

The backup management unit 7 then restores the latest information (set of information) of the information selected in the step S502, within the time range taken charge of by the index as selected by the addition unit from backup 24 (step S504).

The index update unit 23 then registers or updates the information (set of information), as restored by the addition unit from backup 24, in the index selected in the step S503 (step S505). The manner in which to handle the information of the same sort is the same as that in the step S404 of FIG. 13.

If, in the step S505, the processing of index registration of the information (set of information) restored has come to a close, the addition unit from backup 24 checks to see whether or not the totality of the index processing for the information selected in the step S502 has come to a close (step S506).

If the totality of the index processing has not come to a close, processing reverts to the step S503 to repeat the selection of the index to be processed next, restoration of the relevant backup data, and index registration/update (NO branching in the step S506).

If the totality of index processing for the information selected in the step S502 has come to a close, the addition unit from backup 24 verifies, from the information as held by the backup management unit 7, whether or not the information for index registration has been processed in its entirety (step S507). If the processing of the totality of the information has come to a close, the index registration of the backup data comes to a close (YES branching of the step S507).

If the processing of the totality of the information has not come to a close, processing reverts to the step S502 to repeat the processing of selecting the information to be processed next, selecting the index, restoring the relevant backup data, registering the backup data in the index, and updating the backup data (NO branching of the step S507).

As a variant of the processing sequence of FIG. 14, the following processing may also be used. When the addition unit from backup 24 in the step S502 has selected the information for index registration, the addition unit from backup 24 acquires a backup range of the so selected information from the backup management unit 7.

The addition unit from backup 24 then selects the index, including the above backup interval in the time range it takes charge of, and takes out the latest state within the time range it takes charge of, such as to update each index. The backup management system, which may be handled easily with the use of the above method, may be exemplified by a system that records the version hysteresis in terms of a file or a directory as a unit.

As a variant of the processing sequence, shown in FIG. 14, it may be envisaged to eliminate the processing of the steps S503, S504 and S506 and to sequentially process the information acquired from the backup management unit 7. The time information of the information registered in the index is identified at a time point of the step S505 and the index to be updated and registered is selected to perform the processing of registration/updating of the index of interest.

As the sequence of index registration and updating, the methods shown in FIGS. 12 and 13 and like methods may be used. However, optimum methods differ in dependence upon the backup system for the backup management unit 7 and the backup information storage section 6.

As a variant of the information retrieval system of the present exemplary embodiment, such a scheme may be provided which, in its operation, selects an optimum method depending on the sort of the backup management unit 7.

[Operation in Newly Introducing a System]

The sequence of operations in newly introducing an information retrieval system of the present exemplary embodiments now described. There are roughly two methods of registering the information, stored in the information storage section 1, in an index. One of them is the method described by the first exemplary embodiment. The other is a method of registering the information as the subject of retrieval of the information storage section 1 in an arbitrary index which may be divided along an axis different from the time axis.

No matter which of the above methods is used, it is sufficient to perform the processing of index registration of backup data, after termination of the processing for index registration of the information as the subject for retrieval in the information storage section 1, in accordance with the sequence of operations shown by the second exemplary embodiment.

It is also possible to divide the index at a stage of registering the information as stored for retrieval in the information storage section 1, and to search and acquire the information, handled as being the same information as the information of the subject for retrieval, from the backup data, when registering the information as the subject for retrieval in the information storage section 1 in an index. It is noted that the information, handled as being the same information as the information of the subject for retrieval, is not the time information. The information thus acquired from the backup data may then be registered in a relevant index.

With the second exemplary embodiment, described above, data before introducing the chronological information retrieval system may be registered, with the use of the backup data, in the index of the information retrieval system. This represents an advantage that adds to the advantage derived from the above-described first exemplary embodiment.

In index registration of the backup data, it is unnecessary to sequentially restore data, beginning from the old data, or to prepare/update the indexes, beginning from old indexes, with the result that the processing for index registration may be carried out speedily.

The volume of data restored from backup data may basically be reduced, depending on the granularity of the chronological retrieving function to be implemented. Thus, index registration may be carried out speedily, while the load of accessing the backup information storage section 6 may be reduced.

INDUSTRIAL APPLICABILITY

The present invention may be applied to information retrieval systems having the chronological retrieving function of retrieving the information present in the World Wide Web. The present invention may also be applied to a system for retrieving the intra-organization information, such as the information owned by the Intranet webs, intra-organization information systems, databases or storages, or to a system for retrieving the chronological information of backup data. The index registering unit (index registration device) may also be used in introducing the above information retrieval system or in adding the information as the subject for retrieval after introducing the system. In addition, the present invention may be applied not only to the information retrieval system, represented by a retrieval engine, but also to a system at large which divides data chronologically to manage the resulting divided data to store the past information, such as a database.

In the present invention, the following modes are provided without any restriction thereto.

[Mode 1] An information retrieval system may comprise:

an information acquisition unit that acquires information as a subject of retrieval;

a time information specifying unit that specifies time information owned by the information as the subject of retrieval; and an index updating unit that updates the index using the time information specified by the time information specifying unit;

wherein the information retrieval system provides an information retrieving function of reproducing retrieved results at any time point by providing index for information retrieval with the time information and by using data of the index relevant to a reference point of retrieval identified at the time of retrieval.

[Mode 2] In the information retrieval system, the index may be formulated by a set of indexes which are each newly prepared with lapse of preset time and in which the indexes prepared in the past are saved; and retrieved results at any time point are reproduced by referring to the index(es) relevant to the reference point of retrieval specified at the time of retrieval.

[Mode 3] In the information retrieval system in the absence of an index indicative of the time information specified by the time information specifying unit, the index updating unit may prepare an index indicative of the time in question to register the information which becomes a subject for retrieval therein.

[Mode 4] In the information retrieval system if the information which may become the subject for retrieval has been registered in a pre-existing index, the index updating unit compares the time information registered in the pre-existing index to the time information specified to update the index in accordance with a preset priority reference.

[Mode 5] The information retrieval system may further comprise:

an index management unit that changes formulation of the set of indexes on the time axis.

[Mode 6] In the information retrieval system, the retrieved results may be presented by sequentially referencing the indexes beginning from past index data closest to the reference point of retrieval and progressing towards older index data.

[Mode 7] In the information retrieval system, formulation of set of indexes along the time axis may be changed in accordance with a time unit that may be specified in information retrieval.

[Mode 8] In the information retrieval system, the time unit that may be identified in the information retrieval may be the same as a recording interval of the information registered in the index.

[Mode 9] The information retrieval system may further comprise:

a backup data addition unit that acquires backup data from a backup information storage section and delivering the backup data acquired to the index updating unit.

[Mode 10] An information retrieval system may comprise:

means for acquiring the information of a set of indexes which are each newly prepared with lapse of preset time and in which the indexes prepared in the past are saved;

means for selecting any one of the indexes from the set of indexes;

means for acquiring backup data of a time interval indicative of the selected index, from a backup management unit that manages backup data; and an index updating unit that updates the index information of the backup data acquired for the selected index, wherein the system provides an information retrieving function of reproducing retrieved results at any time point by providing an index for information retrieval with the time information and by using data of the index relevant to a reference point of retrieval specified at the time of retrieval.

[Mode 11] An information retrieval system may comprise:

a backup management unit that manages backup data;

means for acquiring a set of indexes which are each newly prepared with lapse of preset time and in which the indexes prepared in the past are saved;

means for selecting information to be registered in an index registering section from the backup management means;

means for acquiring the latest backup data of the selected information from the backup management unit, within a time interval indicated by each index contained in the set of indexes; and an index updating unit that updates each index contained in the set of indexes by the latest backup data of the selected information within a time interval indicated by each index, wherein the system provides an information retrieving function of reproducing retrieved results at any time point by providing an index for information retrieval with the time information and by using data of the index relevant to a reference point of retrieval identified at the time of retrieval.

[Mode 12] An apparatus for registering index may comprise:

an information acquisition unit that acquires information as a subject of retrieval;

a time information specifying unit that specifies time information owned by the information as the subject of retrieval; and an index updating unit that updates a portion of the index corresponding to the time information specified by the time information specifying unit, wherein the apparatus is adapted for reproducing retrieved results at any time point by providing an index for information retrieval with the time information, using data of the index relevant to a reference point of retrieval identified at the time of retrieval.

[Mode 13] A program can be executed on a computer that forms an apparatus for registering indexes. The program may comprise processings of:

acquiring information as a subject of retrieval;

specifying time information owned by the information as the subject of retrieval; and updating a portion of an index or indexes corresponding to the time information specified, wherein the indexes are used as an index for information retrieval with the time information thereby performing information retrieval by using data of the index relevant to a reference point of retrieval identified at the time of retrieval.

[Mode 14] A program can be executed on a computer that forms an apparatus for registering indexes. The program may comprise processings of;

acquiring information of a set of indexes;

selecting any one index from the set of indexes;

acquiring backup data of a time interval represented by the selected index from backup data; and registering or updating the index information for the selected index of the backup data acquired, thereby performing retrieval starting at any time point by using the data of an index for information retrieval composed of a set of indexes which are each newly prepared with lapse of preset time and in which indexes prepared in the past are saved; the data being relevant to a reference point of retrieval specified at the time of retrieval.

[Mode 15] A program can be executed on a computer that forms an apparatus for registering indexes. The program may comprise processings of:

acquiring information of a set of indexes;

selecting the information to be registered in the index from backup data;

acquiring the latest backup data of the selected information within a time interval represented by each index in the set of indexes; and registering or updating, for each of the indexes, the index information of the backup data acquired;

wherein information is retrieved by retrieving at any time point to be reproduced by using data of an index for information retrieval composed of a set of indexes which each newly prepared with lapse of preset time and in which the indexes prepared in the past are saved; the data being relevant to a reference point of retrieval specified at the time of retrieval.

[Mode 16] A method for registering indexes may comprise:

acquiring information as a subject for retrieval;

specifying time information of the subject of retrieval; and updating the index using the time information thus specified;

wherein the method provides retrieval starting at any time point by providing an index for information retrieval with the time information by using data of the index relevant to a reference point of retrieval identified at the time of retrieval.

[Mode 17] A method for registering indexes may comprise:

acquiring information on a set of indexes;

selecting any one index from the set of indexes;

acquiring backup data of a time interval represented by the selected index; and registering or updating, for the index selected, the index information of the backup data acquired, wherein the method enables a retrieval performed at any time point to be reproduced by using data of an index for information retrieval composed of a set of indexes which are each newly prepared with lapse of preset time provided that the indexes prepared in the past are saved; the data being associated with a reference point of retrieval to be identified at the time of retrieval.

[Mode 18] A method for registering indexes may comprise:

acquiring information on a set of indexes by an index registration unit;

selecting information to be registered in the index from a backup management unit designed to manage backup data;

acquiring, from the backup management unit, the latest backup data of the selected information, within a time interval represented by each index included in the set of indexes; and registering or updating, for the index selected, the information of the backup data acquired, wherein an information retrieving is performed so as to retrieve at any time point to be reproduced by using data of an index for information retrieval composed of a set of indexes which are each newly prepared with lapse of preset time provided that the indexes prepared in the past are saved; the data being associated with a reference point of retrieval to be identified at the time of retrieval.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. An information retrieval system comprising:
an information acquisition unit that acquires a document from a storage device;
a time information specifying unit that specifies a time at which the document was acquired from the storage device;
an index updating unit that either creates a new index or updates an existing index from among a plurality of indexes to register the acquired document;
an addition unit from backup that acquires a backup document from a backup information storage device;
a first index corresponding to a first time range and having registered therein a first document; and
a second index corresponding to a second time range, which is prior to the first time range, and having a registered therein the first document,
wherein in response to receiving a request to delete the first document, the information retrieval system deletes the first document from the first index and does not delete the first document from the second index, wherein the index updating unit registers the acquired document and the acquired backup document to the new index or to the existing index based on the time information specified by said time information specifying unit, and wherein the backup information storage device stores backup data of the storage device.

2. An information retrieval system comprising:

an information acquisition unit that acquires a document from a storage device;

a time information specifying unit that specifies a time at which the document was acquired from the storage device;

an index updating unit that either creates a new index or updates an existing index from among a plurality of indexes to register the acquired document;

an addition unit from backup that acquires a backup document from a backup information storage device;

a first index corresponding to a first time range and having registered therein a first document; and a second index corresponding to a second time range, which is prior to the first time range, and having a registered therein the first document, wherein in response to receiving a request to delete the first document, the information retrieval system deletes the first document from the first index and does not delete the first document from the second index, wherein the index updating unit registers the acquired document and the acquired backup document to the new index or to the existing index based on the time information specified by said time information specifying unit, wherein the backup information storage device stores backup data of the storage device, and wherein information indicative of the deletion of the first document is registered in the second index.

* * * * *